US011181909B2

(12) United States Patent
Bando et al.

(10) Patent No.: US 11,181,909 B2
(45) Date of Patent: Nov. 23, 2021

(54) REMOTE VEHICLE CONTROL DEVICE, REMOTE VEHICLE CONTROL SYSTEM, AND REMOTE VEHICLE CONTROL METHOD

(71) Applicant: DENSO TEN Limited, Kobe (JP)

(72) Inventors: Fumiaki Bando, Kobe (JP); Minoru Maehata, Kobe (JP); Miki Hitotsuya, Kobe (JP)

(73) Assignee: DENSO TEN Limited, Kobe (JP)

( * ) Notice: Subject to any disclaimer, the term of this patent is extended or adjusted under 35 U.S.C. 154(b) by 413 days.

(21) Appl. No.: 16/226,907

(22) Filed: Dec. 20, 2018

(65) Prior Publication Data
US 2019/0258247 A1   Aug. 22, 2019

(30) Foreign Application Priority Data
Feb. 19, 2018   (JP) .............................. JP2018-027159

(51) Int. Cl.
*G05D 1/00* (2006.01)
*G06K 9/00* (2006.01)
*B60R 1/00* (2006.01)

(52) U.S. Cl.
CPC ......... *G05D 1/0044* (2013.01); *G05D 1/0016* (2013.01); *G05D 1/0055* (2013.01);
(Continued)

(58) Field of Classification Search
CPC ...... B60R 1/00; G05D 1/0016; G05D 1/0038; G05D 1/0044; G05D 2201/0213; G06K 9/00791
See application file for complete search history.

(56) References Cited

U.S. PATENT DOCUMENTS 8,903,568 B1 * 12/2014 Wang ................... G05D 1/0038
701/2
9,773,281 B1 * 9/2017 Hanson ................. G06Q 40/08
(Continued)

FOREIGN PATENT DOCUMENTS

JP   2010-095027 A   4/2010
JP   2014-065392 A   4/2014
(Continued)

OTHER PUBLICATIONS

U.S. Appl. No. 16/227,174, filed Dec. 20, 2018 in the name of Bando et al.
(Continued)

*Primary Examiner* — Anshul Sood
(74) *Attorney, Agent, or Firm* — Oliff PLC

(57) ABSTRACT

A remote vehicle control device includes: a communication unit configured to receive synthetic images which show a surrounding area of a vehicle as seen from virtual viewpoints and each of which is generated on the basis of plural images acquired by plural on-board cameras mounted on the vehicle, respectively; a display unit configured to display the synthetic images; an operation unit configured for controlling the vehicle; a signal generating unit configured to generate control signals for the vehicle, based on operations on the operation unit; and a sensor unit configured to detect impacts. The control signals are transmitted to the vehicle via the communication unit, and when the sensor unit detects an impact, a control signal for stopping is transmitted to the vehicle.

13 Claims, 17 Drawing Sheets

(52) U.S. Cl.
CPC ............ *G06K 9/00791* (2013.01); *B60R 1/00* (2013.01); *G05D 2201/0213* (2013.01)

(56) References Cited

U.S. PATENT DOCUMENTS

| | | | |
|---|---|---|---|
| 2009/0248220 A1* | 10/2009 | Ecton | B61L 3/127 |
| | | | 701/2 |
| 2013/0194256 A1 | 8/2013 | Gassmann et al. | |
| 2014/0247352 A1 | 9/2014 | Rathi et al. | |
| 2014/0333729 A1 | 11/2014 | Pflug | |
| 2015/0356735 A1 | 12/2015 | Shimizu et al. | |
| 2017/0308080 A1 | 10/2017 | Brooks et al. | |
| 2017/0324943 A1 | 11/2017 | Wu et al. | |
| 2019/0077509 A1 | 3/2019 | Hsu et al. | |
| 2019/0094849 A1* | 3/2019 | Kim | G01S 19/38 |
| 2019/0192055 A1* | 6/2019 | Mizobuchi | B60R 11/02 |
| 2019/0278298 A1 | 9/2019 | Pedersen et al. | |
| 2020/0097001 A1 | 3/2020 | Lavoie et al. | |
| 2020/0264604 A1 | 8/2020 | Tao et al. | |
| 2020/0278673 A1 | 9/2020 | Nakagawa et al. | |

FOREIGN PATENT DOCUMENTS

| | | |
|---|---|---|
| JP | 2016-074285 A | 5/2016 |
| JP | 2016-201613 A | 12/2016 |
| JP | 2016-222243 A | 12/2016 |
| JP | 2018-063294 A | 4/2018 |

OTHER PUBLICATIONS

U.S. Appl. No. 16/227,261, filed Dec. 20, 2018 in the name of Nakamura et al.
U.S. Appl. No. 16/227,377, filed Dec. 20, 2018 in the name of Bando et al.
U.S. Appl. No. 16/227,703, filed Dec. 20, 2018 in the name of Bando et al.
Feb. 5, 2020 Office Action issued in U.S. Appl. No. 16/227,377.
Mar. 3, 2020 Office Action issued in U.S. Appl. No. 16/227,174.
Jan. 26, 2021 Office Action issued in U.S. Appl. No. 16/227,703.
Apr. 26, 2021 Notice of Allowance issued in U.S. Appl. No. 16/227,703.

* cited by examiner

REMOTE VEHICLE CONTROL DEVICE, REMOTE VEHICLE CONTROL SYSTEM, AND REMOTE VEHICLE CONTROL METHOD

CROSS-REFERENCE TO RELATED APPLICATIONS

This application is based on and claims priority under 35 USC 119 from Japanese Patent Application No. 2018-27159 filed Feb. 19, 2018.

BACKGROUND

Technical Field

The present invention relates to a remote vehicle control device, a remote vehicle control system, and a remote vehicle control method.

Related Art

Recently, various technologies relates to remote vehicle control have been proposed. For example, a mobile terminal proposed in Patent Literature 1 is a terminal for moving a vehicle from a first position to a second position. This mobile terminal displays bird's eye view images including an image of the vehicle on the basis of images acquired by a camera installed in the terminal, and receives user's operations for the vehicle. Also, for example, a parking assistance device proposed in Patent Literature 2 makes it possible to park a vehicle using a remote control means such as a joystick. Also, for example, a remote vehicle control system proposed in Patent Literature 3 includes a mobile terminal, which transmits control signals corresponding to touch operations on a touch panel, to a vehicle. This mobile terminal can transmit travel control signals and steering control signals to the vehicle.

[Patent Literature 1] Japanese Patent Application Laid-Open No. 2014-65392
[Patent Literature 2] Japanese Patent Application Laid-Open No. 2010-95027
[Patent Literature 3] Japanese Patent Application Laid-Open No. 2016-74285

SUMMARY

However, the technologies according to the related art have a problem that convenience and operability in remote vehicle control are not thoroughly satisfactory.

The present invention was made in view of the above-mentioned problem, and an object of the present invention is to provide a technology capable of improving convenience and operability in remote vehicle control.

According to an aspect of the present disclosure, there is provided a remote vehicle control device including: a communication unit configured to receive synthetic images which show a surrounding area of a vehicle as seen from virtual viewpoints and each of which is generated on the basis of plural images acquired by plural on-board cameras mounted on the vehicle, respectively; a display unit configured to display the synthetic images; an operation unit configured for controlling the vehicle; a signal generating unit configured to generate control signals for the vehicle, based on operations on the operation unit; and a sensor unit configured to detect impacts. The control signals are transmitted to the vehicle via the communication unit, and when the sensor unit detects an impact, a control signal for stopping is transmitted to the vehicle.

In the remote vehicle control device, in a case of transmitting control signals related to traveling of the vehicle, any one of traveling velocity and traveling distance may be constant.

The remote vehicle control device may further include an authentication unit configured to determine whether control of the remote vehicle control device on the vehicle has been permitted.

The remote vehicle control device may further include a camera configured to image the surrounding area of the remote vehicle control device. The authentication unit may permit a user to operate the operation unit on the basis of a driving license imaged by the camera.

In the remote vehicle control device, the authentication unit may discriminate the driving license on the basis of the user's face imaged by the camera and a face photo on the driving license.

In the remote vehicle control device, the operation unit may receive operations for the vehicle using inputting of numeric values.

In the remote vehicle control device, the sensor unit may detect a tilt of the remote vehicle control device, and derives a steering angle for the vehicle, on the basis of the tilt.

The remote vehicle control device may further include a camera configured to image the surrounding area of the remote vehicle control device; and an operation discriminating unit configured to discriminate operation contents for the vehicle, on the basis of gestures of a user imaged by the camera or the on-board cameras. The signal generating unit may generate control signals based on operations for the vehicle related to the gestures.

In the remote vehicle control device, the operation unit may receive an operation track related to a traveling route of the vehicle, and the signal generating unit may generate a control signal related to the traveling route of the vehicle, on the basis of the operation track.

In the remote vehicle control device, the remote vehicle control device may change a traveling velocity of the vehicle on the basis of a velocity at which the operation track is drawn.

In the remote vehicle control device, the remote vehicle control device may change a traveling velocity of the vehicle on the basis of a thickness of the operation track.

In the remote vehicle control device, the sensor unit may acquire location information of the remote vehicle control device, and the signal generating unit may generate a control signal related to a traveling route of the vehicle on the basis of a track of movement of the remote vehicle control device.

According to an aspect of the present disclosure, there is provided a remote vehicle control system including: the above remote vehicle control device; an image processing device configured to generate each of the synthetic images showing the surrounding area of the vehicle as seen from the virtual viewpoints, on the basis of plural images acquired by the plural on-board cameras mounted on the vehicle, respectively, and transmit the synthetic images to the remote vehicle control device; and a vehicle control device configured to receive the control signals for the vehicle from the remote vehicle control device, and control the vehicle on the basis of the control signals.

According to an aspect of the present disclosure, there is provided a remote vehicle control method including: receiving synthetic images which show a surrounding area of a vehicle as seen from virtual viewpoints and each of which is generated on the basis of plural images acquired by plural on-board cameras mounted on the vehicle, respectively; displaying the synthetic images; receiving operations for the vehicle; generating control signals for the vehicle, based on the operations; and transmitting the control signals to the vehicle. When an impact is detected, a control signal for stopping is transmitted to the vehicle.

According to the configuration of the present invention, for example, in the case where it is required to stop the vehicle as soon as possible, it is unnecessary to find a button or the like for stopping the vehicle, on the remote vehicle control device. Also, for example, the remote vehicle control device may perform authentication related to permission or prohibition of control on the vehicle. Also, for example, by inputting numeric values, it is possible to control the vehicle. Also, for example, by the remote vehicle control device, it is possible to control the lights and the alarm device of the vehicle. In other words, it is possible to improve convenience and operability in remote control on the vehicle.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the present invention will be described in detail with reference to the drawings. However, the present invention is not limited to the contents of the embodiments to be described below.

Also, in the following description, in the straight advancing direction of a vehicle, the direction from the driver's seat toward the steering wheel is referred to as the forward direction (the front side). In the straight advancing direction of the vehicle, the direction from the steering wheel toward the driver's seat is referred to as the backward direction (the rear side). In the direction perpendicular to the straight advancing direction of the vehicle and the vertical direction, the direction from the right side of the driver facing forward to the left side is referred to as the left direction. In the direction perpendicular to the straight advancing direction of the vehicle and the vertical direction, the direction from the left side of the driver facing forward to the right side is referred to as the right direction.

1. Configuration of Remote Vehicle Control System

Figure 1:
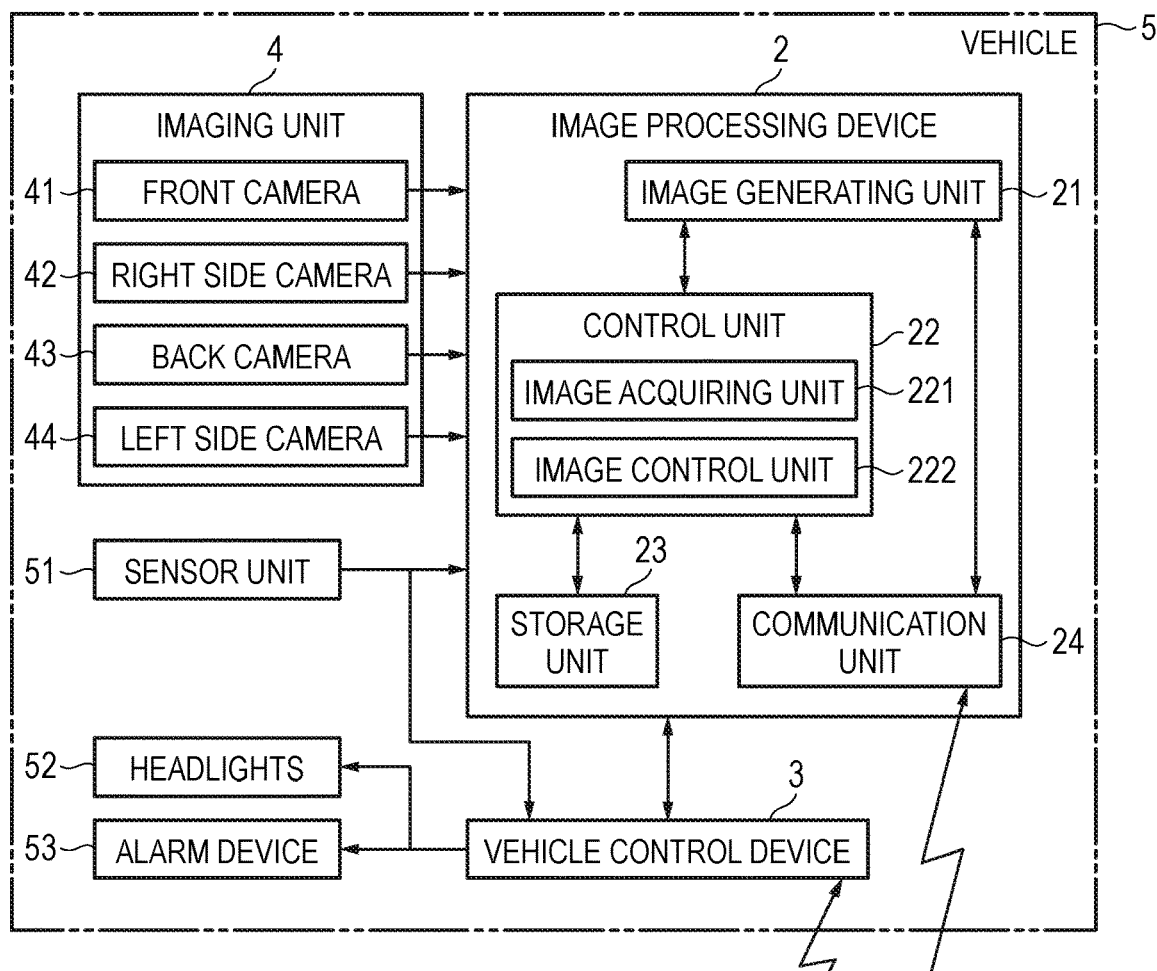
FIG. 1 is a block diagram illustrating the configuration of a remote vehicle control system of an embodiment.
Figure 1:
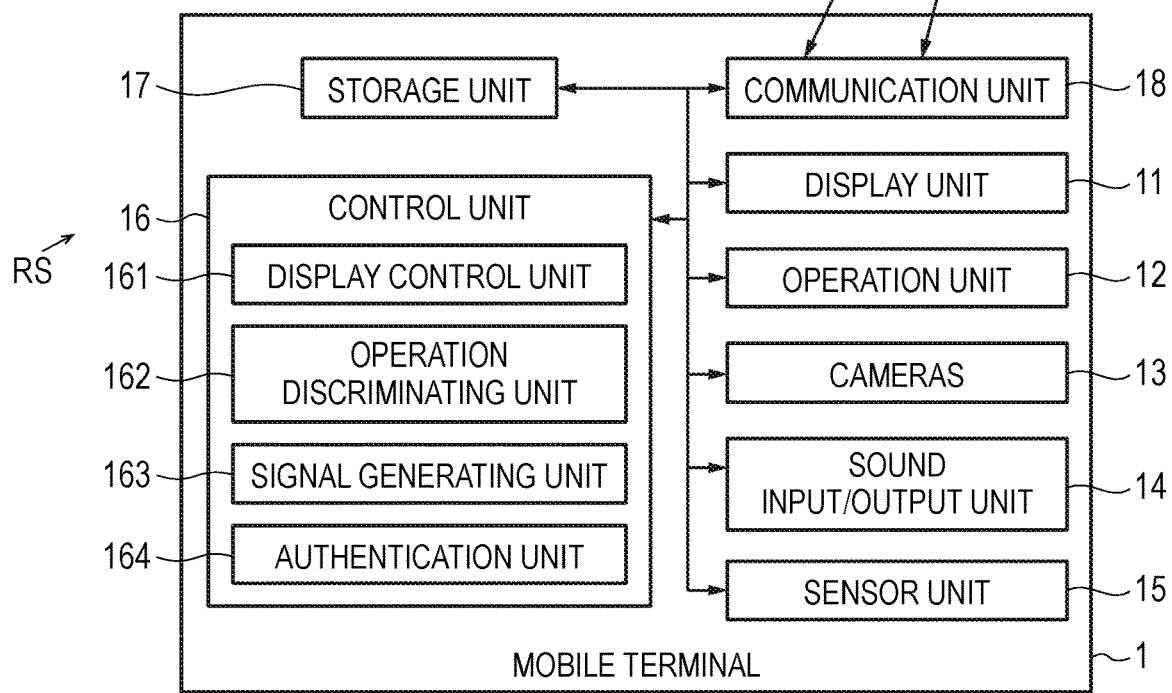

FIG. 1 is a block diagram illustrating the configuration of a remote vehicle control system RS of an embodiment. The remote vehicle control system RS includes a mobile terminal 1, an image processing device 2, and a vehicle control device 3. The mobile terminal 1 is a remote vehicle control device for remotely controlling a vehicle 5. The image processing device 2 and the vehicle control device 3 are mounted on the vehicle 5. The remote vehicle control system RS is a system for remotely controlling the vehicle 5 by the mobile terminal 1 which displays synthetic images showing the surrounding area of the vehicle 5. The vehicle 5 further includes an imaging unit 4 (on-board cameras), a sensor unit 51, headlights 52, and an alarm device 53.

The mobile terminal 1 is a device configured to receive images for display which are output from the image processing device 2, and display the images, and transmit control signals to the vehicle control device 3, to remotely control the vehicle 5. Examples of the mobile terminal 1 include smart phones, tablet type terminals, and so on belonging to the owner of the vehicle 5 and so on. In the present embodiment, the mobile terminal 1 is, for example, a smart phone.

The image processing device 2 is a device configured to process images acquired by the on-board cameras. For each vehicle equipped with on-board cameras, an image processing device 2 is provided. In the present embodiment, the image processing device 2 acquires images from the imaging unit 4, and processes the images. Also, the image processing device 2 may acquire information from the sensor unit 51, and performs determinations related to image processing on the basis of the acquired information.

The vehicle control device 3 performs control on the general operation of the vehicle. The vehicle control device 3 includes, for example, an engine ECU (Electronic Control Unit) for controlling the engine, a steering ECU for controlling the steering, a brake ECU for controlling the brake, a shift ECU for controlling the shift, a power source control ECU for controlling the power source, a light ECU for controlling the lights, a mirror ECU for controlling the electric mirrors, and so on. In the present embodiment, the vehicle control device 3 transmits information to the mobile terminal 1 and the image processing device 2, and receives information from them. The vehicle control device 3 receives control signals for the vehicle 5, from the mobile terminal 1, and controls the vehicle 5 on the basis of the control signals.

Figure 2:
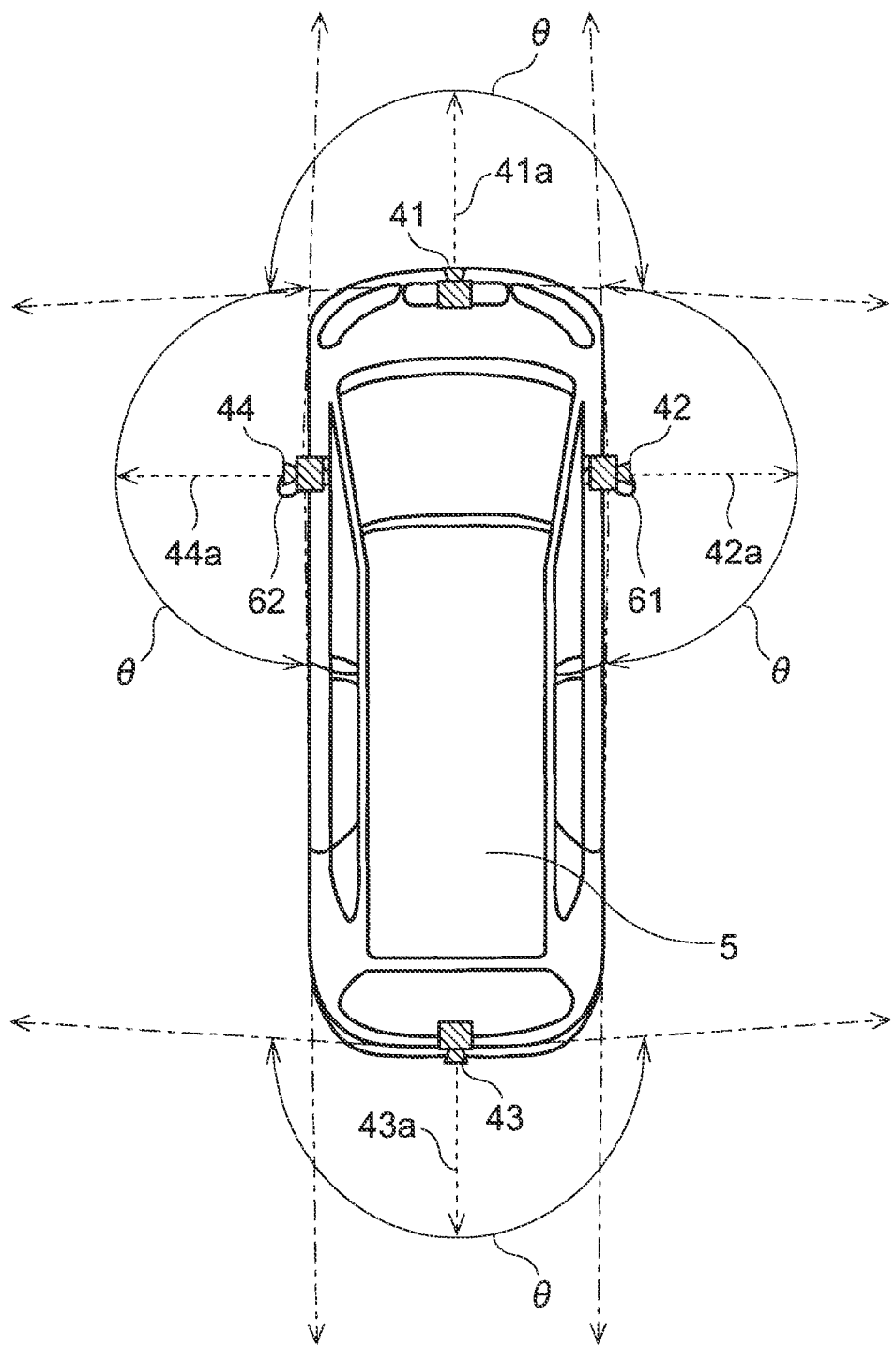
FIG. 2 is a view illustrating positions on a vehicle where on-board cameras are disposed.

The imaging unit 4 is provided for monitoring the condition around the vehicle. The imaging unit 4 includes, for example, four on-board cameras 41 to 44. FIG. 2 is a view illustrating positions on the vehicle 5 where the on-board cameras 41 to 44 are disposed.

The on-board camera 41 is installed on the front end of the vehicle 5. Therefore, the on-board camera 41 is also referred to as the front camera 41. The optical axis 41a of the front camera 41 extends along the longitudinal direction of the vehicle 5 as seen in a plan view illustrating the vehicle as seen from the above. The front camera 41 images the area in front of the vehicle 5. The on-board camera 43 is installed on the rear end of the vehicle 5. Therefore, the on-board camera 43 is also referred to as the back camera 43. The optical axis 43a of the back camera 43 extends along the longitudinal direction of the vehicle 5 as seen in a plan view illustrating the vehicle as seen from the above. The back camera 43 images the area behind the vehicle 5. It is preferable that the installation positions of the front camera 41 and the back camera 43 be at the center in the width direction of the vehicle 5; however, the front camera and the back camera may be slightly deviated to the left or the right from the center in the width direction.

The on-board camera 42 is installed on a right mirror 61 of the vehicle 5. Therefore, the on-board camera 42 is also referred to as the right side camera 42. The optical axis 42a of the right side camera 42 extends along the width direction of the vehicle 5 as seen in a plan view illustrating the vehicle as seen from the above. The right side camera 42 images the area on the right side of the vehicle 5. The on-board camera 44 is installed on a left mirror 62 of the vehicle 5. Therefore, the on-board camera 44 is also referred to as the left side camera 44. The optical axis 44a of the left side camera 44 extends along the width direction of the vehicle 5 as seen in a plan view illustrating the vehicle as seen from the above. The left side camera 44 images the area on the left side of the vehicle 5.

However, in the case where the vehicle 5 is a so-called door-mirror-less vehicle, the right side camera 42 may be installed in the vicinity of the pivot (hinge part) of the right side door, without interposing a door mirror therebetween, and the left side camera 44 may be installed in the vicinity of the pivot (hinge part) of the left side door, without interposing a door mirror therebetween.

As lenses for the on-board cameras 41 to 44, for example, fisheye lenses are used. Each of the on-board cameras 41 to 44 has an angle of view θ equal to or greater than 180 degrees in the horizontal direction. Therefore, it is possible to image the area around the vehicle 5 in the horizontal direction.

FIG. 1 will be further described. The sensor unit 51 includes a plurality of sensors for detecting information related to the vehicle 5 equipped with the on-board cameras 41 to 44. In information related to the vehicle 5, information on the vehicle and information on the surrounding area of the vehicle may be included. In the present embodiment, in the sensor unit 51, for example, a vehicle velocity sensor for detecting the velocity of the vehicle, a steering angle sensor for detecting the rotation angle of the steering, a shift sensor for detecting the operation position of the shift lever of the transmission of the vehicle, an illuminance sensor for detecting the illuminance in the surrounding area of the vehicle, a vibration sensor for detecting vibration of the vehicle, a tilt sensor for detecting the tilt of the vehicle, obstacle sensors for detecting people, animals, vehicles, and other objects in the surrounding area of the vehicle, and so on are included.

The obstacle sensors may use, for example, ultrasonic sensors, light sensors using infrared light or the like, radars, and the like to detect people, animals, vehicles, and other objects in the surrounding area of the vehicle. The obstacle sensors are embedded at a plurality of positions, for example, in the front bumper, the rear bumper, the doors, and so on of the vehicle 5. The obstacle sensors transmit transmission waves toward the surrounding area of the vehicle, and receive waves reflected from people, other vehicles, and so on, to detect whether there are objects such as people, other vehicles, and so on, and the directions and positions of objects.

The headlights 52 are provided on the front end of the vehicle 5. The headlights 52 are lighting devices for lighting the area in front of the vehicle 5. The alarm device 53 is a so-called horn, and emits an alarming sound to the surrounding area.

2. Configuration of Mobile Terminal

The mobile terminal 1 is configured to include a display unit 11, an operation unit 12, cameras 13, a sound input/output unit 14, sensor unit 15, a control unit 16, a storage unit 17, and a communication unit 18.

The display unit 11 is disposed on the front surface of the mobile terminal 1 which is a smart phone. The display unit 11 displays, for example, images for display which are output from the image processing device 2, on the screen. The display unit 11 has a touch panel, as a part of the operation unit 12, on the front surface, and the touch panel is, for example, a liquid crystal display panel.

The operation unit 12 includes, for example, the touch panel provided on the front surface of the display unit 11, other operation buttons, and so on. The operation unit 12 is configured such that a user may input information from the outside, i.e. the user may perform operations such as operations of inputting characters, numbers, and so on, operations of selecting a menu or a choice, and operations for performing or canceling a process. In the present embodiment, the operation unit 12 is a touch panel usable to operate the vehicle 5. However, the operation unit 12 is not limited to software keys using a touch panel or the like, and may be hardware keys provided as physical input units on the mobile terminal 1.

The cameras 13 are disposed on the front surface and rear surface of the mobile terminal 1 which is a smart phone. The front camera 13 images the front surface side of the surrounding area of the mobile terminal 1. The rear camera 13 images the rear surface side of the surrounding area of the mobile terminal 1.

The sound input/output unit 14 includes, for example, a microphone and a speaker. The microphone acquires information on sounds around the mobile terminal 1, including sound which is uttered by the user. The speaker emits notifying sound, sound on a communication line, and so on to the outside.

The sensor unit 15 has sensors for detecting information related to the mobile terminal 1. In the present embodiment, the sensor unit 15 includes, for example, a vibration sensor for detecting vibration of the mobile terminal, a tilt sensor for detecting the tilt of the mobile terminal, a GPS (Global Positioning System) sensor for acquiring information on the location of the mobile terminal, and so on. The vibration sensor may also detect impacts on the mobile terminal. As the vibration sensor and the tilt sensor, for example, an accelerator sensor and a gyroscope sensor may be used together so as to detect vibration, impacts, and the tilt of the mobile terminal. Also, the sensor unit 15 has a vibration motor for a vibration function of the mobile terminal 1.

As for impacts, specifically, the sensor unit 15 may detect change in acceleration of the mobile terminal 1, and may also detect impacts (air vibration) attributable to sounds such as sounds which the user utters and sounds which are created by snapping fingers. Also, for example, the sensor unit 15 may detect impactive touch operations, rapid pressing, and the like which are performed on the operation unit 12, as impacts. Also, for example, the sensor unit 15 may detect operations such as a series of rapid taps, dragging, and flicking, operations involving rapid reciprocations, and so on which are performed on the operation unit 12, as impacts.

Especially, since detecting change in acceleration of the mobile terminal 1 and sounds uttered by the user does not need advance preparation such as checking and referring to operated parts, specially speedy reaction becomes possible.

The control unit 16 is a so-called microcomputer including a CPU (Central Processing Unit), a RAM (Random Access Memory), and a ROM (Read Only Memory) (not shown in the drawings). The control unit 16 performs information processing and information transmission and reception on the basis of a program stored in the storage unit 17. The control unit 16 is connected to the display unit 11, the operation unit 12, the cameras 13, the sound input/output unit 14, the sensor unit 15, the storage unit 17, and the communication unit 18 by wire.

The control unit 16 includes a display control unit 161, an operation discriminating unit 162, a signal generating unit 163, and an authentication unit 164. The CPU performs arithmetic processing according to a program, whereby the functions of the individual components of the control unit 16 are implemented.

The display control unit 161 controls display contents of the display unit 11. For example, if receiving inputs for performing and setting various functions of the mobile terminal 1, the display control unit 161 controls the display unit 11 such that the display unit displays function images related to the functions. The function images are images corresponding to various functions of the mobile terminal 1, and includes, for example, icons, buttons, software keys, slide bars, slide switches, check boxes, text boxes, and so on. The user may select the function images displayed on the display unit 11 by touching the touch panel (the operation unit 12), thereby performing and setting various functions of the mobile terminal 1.

The operation discriminating unit 162 receives detection signals output from the touch panel (the operation unit 12), and discriminates the contents of operations performed on the touch panel, on the basis of the detection signals. The operation discriminating unit 162 discriminates operations such as tapping, dragging, flicking, and so on, besides information on positions on the touch panel. In the case of operations using moving, such as dragging and flicking, the operation discriminating unit also discriminates the movement directions, the movement distances, and so on.

The signal generating unit 163 generates control signals for the vehicle 5 on the basis of operations on the operation unit 12. The generated control signals for the vehicle 5 are transmitted to the vehicle control device 3 via the communication unit 18.

The authentication unit 164 determines whether control on the vehicle 5 using the operation unit 12 has been permitted. The authentication unit 164 determines permission or prohibition of control on the vehicle 5 on the basis of specific information for specifying the mobile terminal 1 and the user. The specific information of the mobile terminal 1 is, for example, an ID, a phone number, a MAC address, or the like set and stored in the storage unit 17 in advance.

The storage unit 17 is a non-volatile memory such as a flash memory, and stores a variety of information. The storage unit 17 stores, for example, programs which are firmware, a variety of data necessary for the control unit 16 to perform various functions, and so on.

The communication unit 18 may be connected to various external devices, for example, wirelessly. The mobile terminal 1 may receive images for display (synthetic images) showing the surrounding area of the vehicle 5, generated by the image processing device 2 of the vehicle 5, and a variety of information (the steering angle, the shift position, the vehicle velocity, obstacle information, and so on) detected by the sensor unit 51. The mobile terminal 1 may transmit control signals for the vehicle 5 based on operations on the operation unit 12, to the vehicle control device 3 via the communication unit 18.

3. Configuration of Image Processing Device

The image processing device 2 is configured to include an image generating unit 21, a control unit 22, a storage unit 23, and a communication unit 24.

The image generating unit 21 generates images for display by processing images acquired by the imaging unit 4. In the present embodiment, the image generating unit 21 is configured as a hardware circuit capable of a variety of image processing. In the present embodiment, the image generating unit 21 generates synthetic images showing the surrounding of the vehicle 5 as seen from virtual viewpoints, on the basis of images acquired by the on-board cameras 41 to 44 mounted on the vehicle 5. Further, the image generating unit 21 generates images for display to be displayed on the mobile terminal 1, on the basis of the synthetic images. Details of the method of generating synthetic images will be described below.

The control unit 22 is a so-called microcomputer including a CPU, a RAM, and a ROM (not shown in the drawings). The control unit 22 performs information processing and information transmission and reception on the basis of a program stored in the storage unit 23. The control unit 22 is connected to the mobile terminal 1, the vehicle control device 3, the imaging unit 4, and the sensor unit 51 by wire or wirelessly.

The control unit 22 includes an image acquiring unit 221 and an image control unit 222. The CPU performs arithmetic processing according to a program, whereby the functions of the individual components of the control unit 22 are implemented.

The image acquiring unit 221 acquires images acquired by the on-board cameras 41 to 44. In the present embodiment, the number of on-board cameras 41 to 44 is four, and the image acquiring unit 221 acquires images acquired by the individual on-board cameras 41 to 44.

The image control unit 222 controls image processing which is performed by the image generating unit 21. For example, the image control unit 222 issues instructions related to various parameters necessary to generate synthetic images and images for display, to the image generating unit 21. Also, the image control unit 222 performs control to output images for display generated by the image generating unit 21 to the mobile terminal 1. However, in this description, images for display which are related to synthetic images and are displayed on the display unit 11 of the mobile terminal 1 are also referred to simply as synthetic images.

The storage unit 23 is a non-volatile memory such as a flash memory, and stores a variety of information. The storage unit 23 stores, for example, programs which are firmware, a variety of data necessary for the image generating unit 21 to generate synthetic images and images for display. Also, the storage unit 23 stores a variety of data necessary for the image acquiring unit 221 and the image control unit 222 to perform processing.

The communication unit 24 may be connected to the mobile terminal 1, for example, wirelessly. The image processing device 2 may output images for display generated by the image generating unit 21, and a variety of information (the steering angle, the shift position, the vehicle velocity, obstacle information, and so on) detected by the sensor unit 51, to the mobile terminal 1 via the communication unit 24.

4. Generation of Synthetic Images

Figure 3:
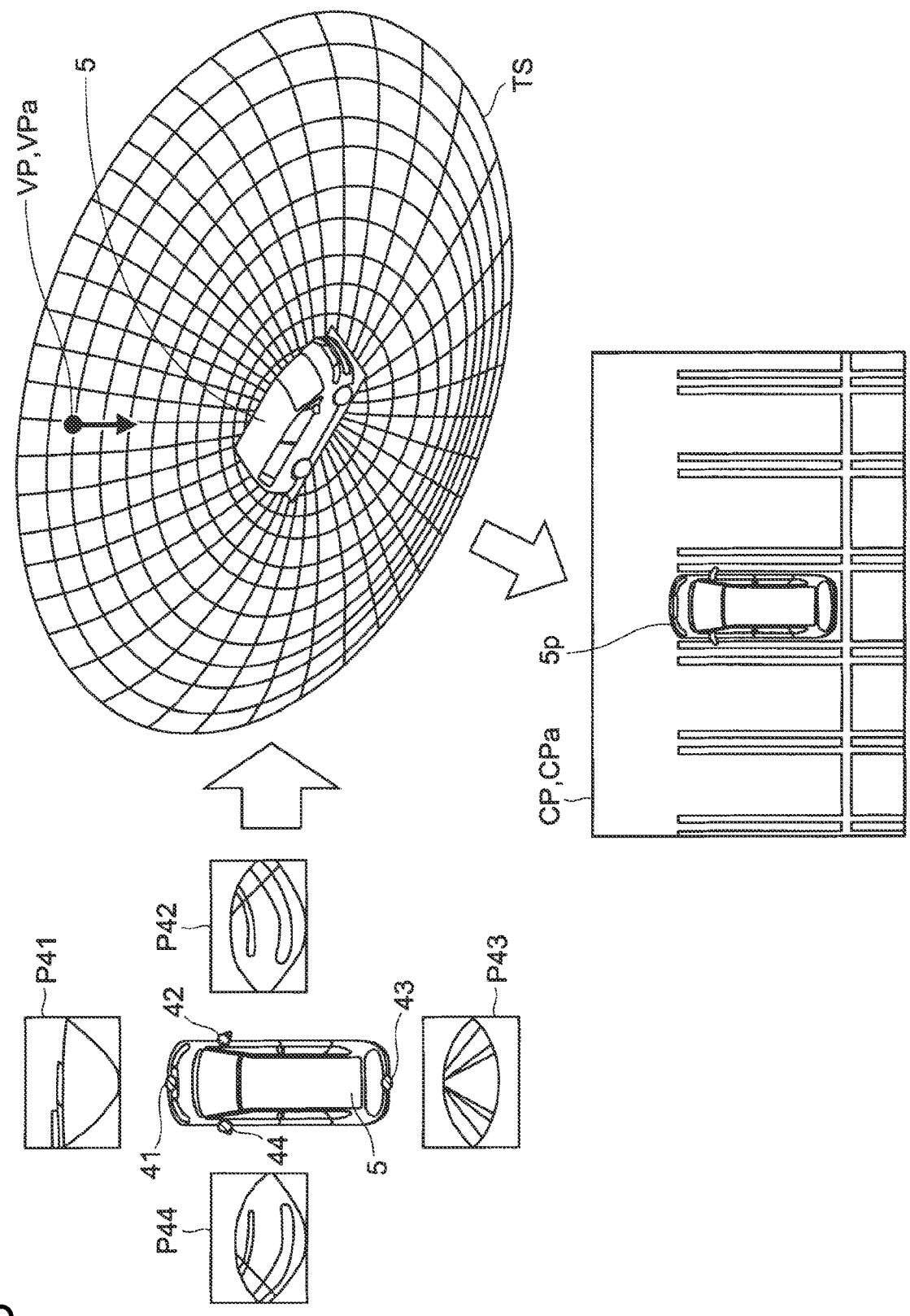
FIG. 3 is a view for explaining a method of generating synthetic images showing the surrounding area of the vehicle.

The method by which the image generating unit 21 generates synthetic images showing the condition in the surrounding area of the vehicle 5 as seen from virtual viewpoints will be described. FIG. 3 is a view for explaining the method of generating synthetic images CP showing the surrounding area of the vehicle 5.

By the front camera 41, the right side camera 42, the back camera 43, and the left side camera 44, four images P41 to P44 showing the front side, the right side, the rear side, and the left side of the vehicle 5 respectively are acquired at the same time. In the four images P41 to P44, data on all over the surrounding area of the vehicle 5 is included. The image generating unit 21 acquires the four images P41 to P44 via the image acquiring unit 221.

The image generating unit 21 projects the data included in the four images P41 to P44 (the values of the individual pixels), onto a projection plane TS which is a three-dimensional curved plane in a virtual three-dimensional space. The projection plane TS has, for example, a substantially hemispherical shape (a bowl shape), and the center thereof (a bottom part of the bowl) is determined as the position of the vehicle 5.

Onto an area of the projection plane TS on the outside of the area for the vehicle 5, the image data is projected. The correspondence relation between the positions of the individual pixels which are included in the images P41 to P44 and the positions of the individual pixels on the projection plane TS is determined in advance. Table data representing that correspondence relation is stored in the storage unit 23. The values of the individual pixels on the projection plane TS may be determined on the basis of the above-mentioned correspondence relation and the values of the individual pixels included in the images P41 to P44.

Next, the image generating unit 21 sets a virtual viewpoint VP in the three-dimensional space under the control of the image control unit 222. The virtual viewpoint VP is defined by a viewpoint position and a sight line direction. The image generating unit 21 may set a virtual viewpoint VP having an arbitrary viewpoint position and an arbitrary sight line direction, in the three-dimensional space. The image generating unit 21 extracts data projected onto an area of the projection plane TS included in the field of view as seen from the set virtual viewpoint VP, as an image. In this way, the image generating unit 21 generates synthetic images as seen from arbitrary virtual viewpoints VP.

For example, as shown in FIG. 3, in the case of assuming a virtual viewpoint VPa defined by a viewpoint position which is right above the vehicle 5 and a sight line direction which is a straight downward direction, it is possible to generate a synthetic image (a bird's eye view image) CPa showing the vehicle 5 and the surrounding of the vehicle 5.

Also, images 5p of the vehicle 5 to be shown in synthetic images CPa are prepared as data such as bitmaps and are stored in the storage unit 23, in advance. When a synthetic image CPa is generated, the data of an image 5p of the vehicle 5 having a shape according to a viewpoint position and a sight line direction defining a virtual viewpoint VP of the synthetic image is read out, and is included in the synthetic image.

As described above, the image generating unit 21 may generate realistic synthetic images CPa, using the virtual three-dimensional projection plane TS.

Also, it is possible to check the surrounding area of the vehicle 5 using synthetic images of the surrounding area of the vehicle 5, each of which has been generated on the basis of a plurality of images acquired by the plurality of on-board cameras 41 to 44 mounted on the vehicle 5, respectively. Therefore, it is also possible to check blind areas from the position of the user, such as an area on the opposite side of the vehicle 5 screened by the vehicle 5 as seen from the position of the user.

First Example

5. Examples of Remote Vehicle Control Using Mobile Terminal 5-1. First Example

Figure 4:
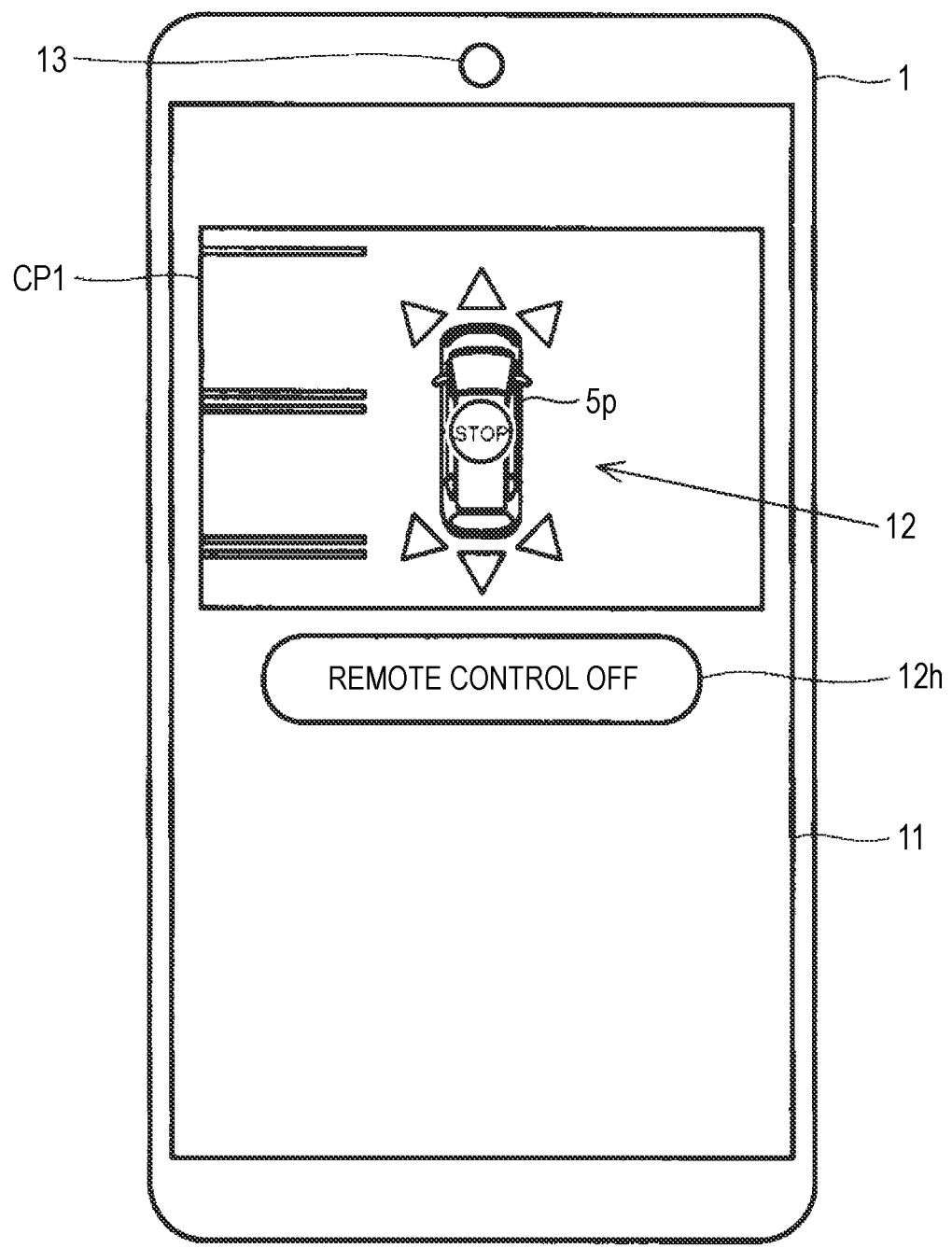
FIG. 4 is a schematic diagram illustrating a mobile terminal displaying a synthetic image according to a first example.

The mobile terminal 1 may receive images for display (synthetic images) which are output from the image processing device 2, and display the images on the display unit 11. FIG. 4 is a schematic diagram illustrating the mobile terminal 1 displaying a synthetic image CP1 according to a first example.

Figure 5:
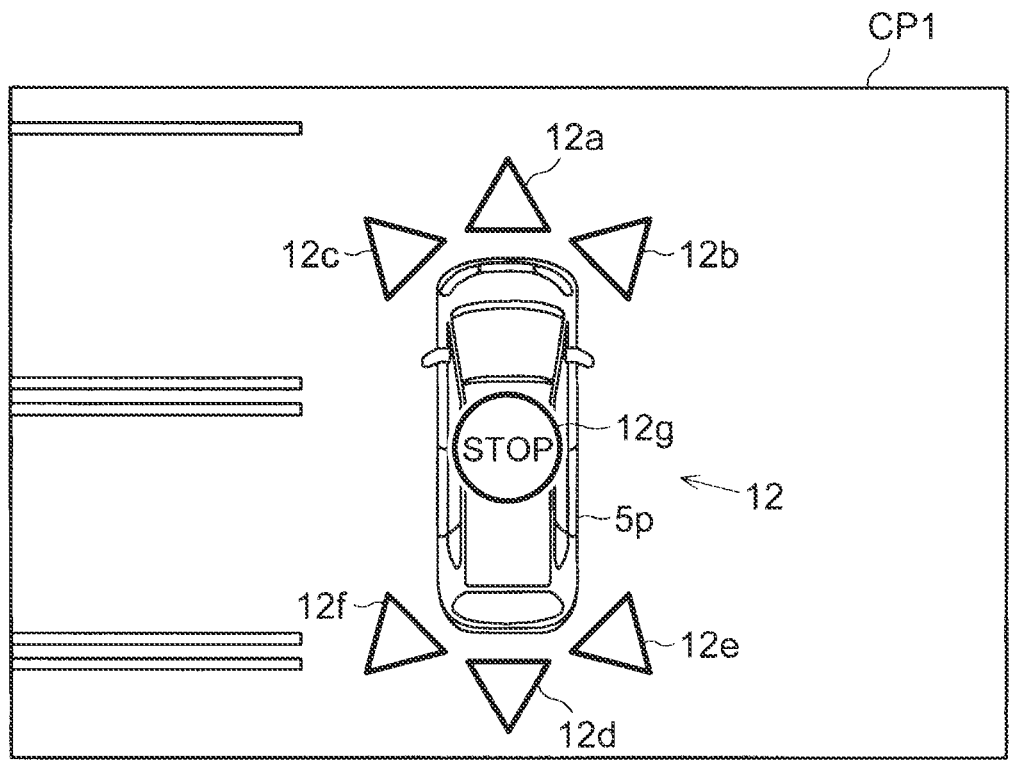
FIG. 5 is a schematic diagram illustrating a synthetic image displayed on the mobile terminal according to the first example.

FIG. 5 is a schematic diagram illustrating the bird's eye view image CP1 displayed on the mobile terminal 1 according to the first example. As shown in FIG. 5, on the occasion of remotely controlling the vehicle 5, the mobile terminal 1 displays icons and so on which are function images related to remote control on the vehicle 5, on the display unit 11. In other words, on the bird's eye view image CP1, icons and so on which are images of the operation unit 12 are superimposed. The operation unit 12 is disposed according to the position of the image 5p of the vehicle 5 on the bird's eye view image CP1.

Specifically, on the screen of the display unit 11, for example, an icon 12a related to forward traveling, an icon 12b related to the front right side, an icon 12c related to the front left side, an icon 12d related to backward traveling, an icon 12e related to the rear right side, and an icon 12f related to the rear left side are displayed so as to overlap the synthetic image CP1. These icons related to traveling of the vehicle 5 are disposed at positions corresponding to the individual traveling directions, for example, around the image 5p of the vehicle 5. In the present example, the icons indicating the movement directions of the vehicle 5 are configured, for example, in a triangular shape; however, they may be configured in any other shape such as an arrow shape.

Also, a "STOP" icon 12g related to stopping of the vehicle 5 is disposed so as to overlap the image 5p of the vehicle 5. Further, outside the bird's eye view image CP1, an icon 12h for ending remote control on the vehicle 5 is displayed.

The user may arbitrarily operate the icons with fingers. The operation discriminating unit 162 discriminates operation contents corresponding to the icons on the basis of detection signals of the touch panel (the operation unit 12). The signal generating unit 163 generates control signals for the vehicle 5, on the basis of the operation contents corresponding to the icons. The control signals are transmitted to the vehicle control device 3 via the communication unit 18. Also, in the case of transmitting control signals related to traveling of the vehicle 5, any one of the traveling velocity and the traveling distance is fixed. For example, the traveling velocity is set to a low velocity, and the traveling distance is set to a short distance.

For example, if the user presses (touches) the icon 12a related to forward traveling of the vehicle 5 once, the vehicle 5 travels forward by a predetermined distance (for example, 10 cm). Also, for example, if the user presses the icon 12c related to the front left side of the vehicle 5, the vehicle 5 changes the steering angle by a predetermined angle such that the vehicle travels to the front left side. In this configuration, whenever changing the steering angle, the orientation of the image 5p of the vehicle 5 may be changed such that it is possible to easily grasp which direction the vehicle is turning to. Subsequently, if the user presses the icon 12a related to forward traveling once, the vehicle 5 travels to the front left side by a predetermined distance. However, the movement direction, traveling distance, and so on may be controlled on the basis of operations using moving which is performed on the touch panel (the operation unit 12), such as dragging and flicking.

In the case where the user wants to stop the vehicle 5 when the vehicle is traveling, if the user presses the "STOP" icon 12g related to stopping of the vehicle 5, the vehicle 5 stops. Alternatively, the vehicle 5 may travel only when the user is pressing the icon 12a related to forward traveling or the icon 12d related to backward traveling, and if the user removes the finger from the icon 12a or the icon 12d, the vehicle 5 may stop.

Also, as described above, the operation unit 12 may be hardware keys.

During remote control, obstacles around the vehicle 5, such as people, animals, vehicles, and other objects, are detected by the sensor unit 51 of the vehicle 5. If the sensor unit 51 detects any obstacle, a detection signal is transmitted to the vehicle control device 3, and the vehicle control device 3 automatically stops the vehicle 5.

Figure 6:
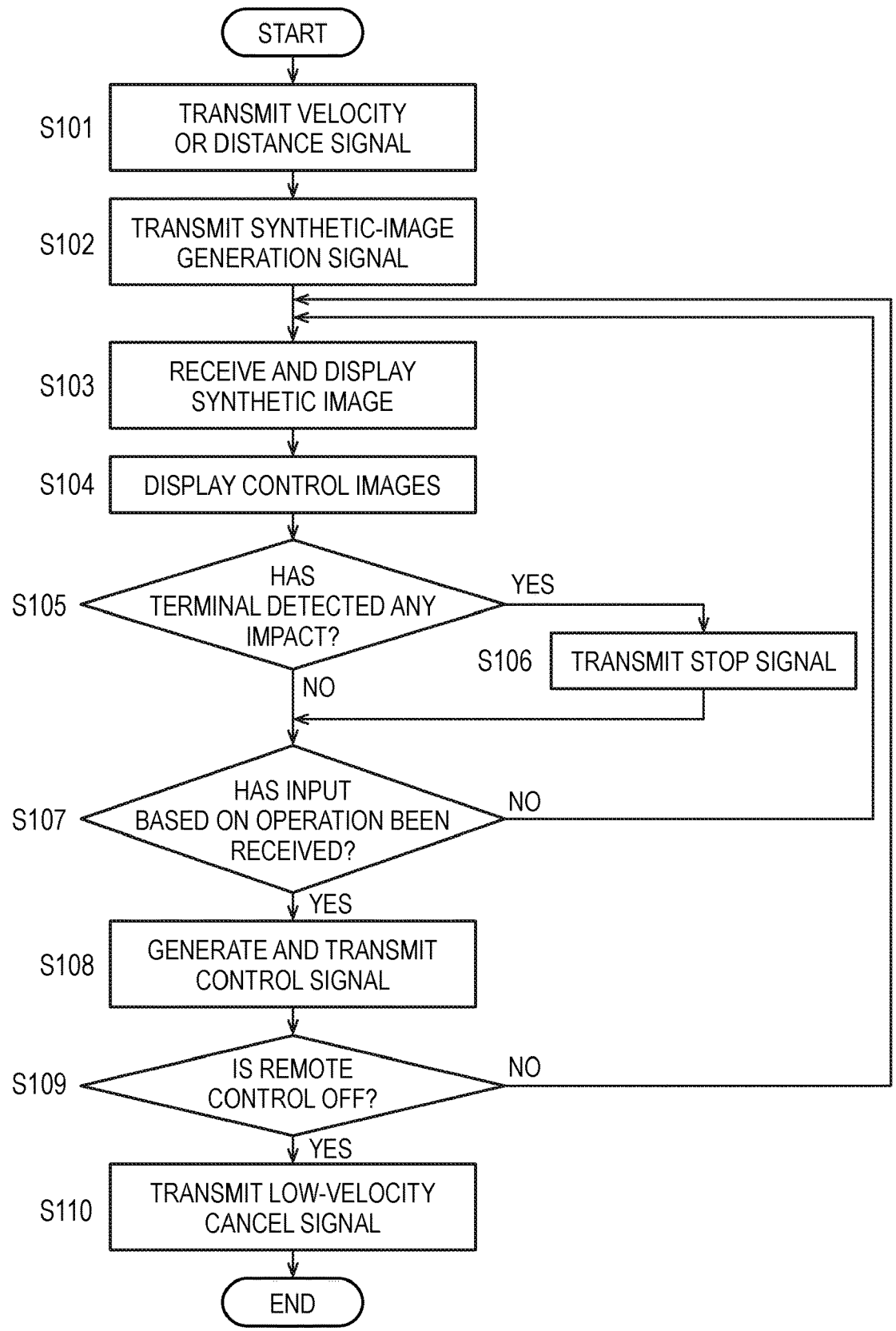
FIG. 6 is a flow chart illustrating an example of the flow of processing related to remote vehicle control according to the first example.

FIG. 6 is a flow chart illustrating an example of the flow of processing related to remote vehicle control according to the first example. The processing which is related to remote control on the vehicle 5 and is performed by the mobile terminal 1 of the first example will be described with reference to the processing flow of FIG. 6.

For example, if the mobile terminal 1 is operated by the user, and receives a remote control start instruction from the operation unit 12, the processing of the mobile terminal 1 related to remote control on the vehicle 5 is started ("START" of FIG. 6). Remote control on the vehicle 5 is started when the vehicle 5 is stopped.

Next, with respect to the traveling velocity of the vehicle 5, the mobile terminal 1 transmits a constant-velocity control signal to the vehicle control device 3 of the vehicle 5 (STEP S101). In this way, one of the traveling velocity and traveling distance of the vehicle 5 is set so as to be fixed while remote control according to the processing flow is performed.

Next, the mobile terminal 1 transmits a control signal related to generation of synthetic images CP1 to the image processing device 2 of the vehicle 5 (STEP S102). The image processing device 2 acquires a plurality of images of the surrounding area of the vehicle 5 from the individual on-board cameras 41 to 44. The image generating unit 21 generates a synthetic image CP1 showing the surrounding area of the vehicle 5 as seen a virtual viewpoint, on the basis of the plurality of images of the surrounding area of the vehicle 5.

Next, the mobile terminal 1 receives the synthetic image CP1 from the image processing device 2, and displays the synthetic image CP1 on the display unit 11 (STEP S103). Subsequently, the mobile terminal 1 displays the icons and so on (the operation unit 12) which are function images related to control on the vehicle 5, so as to overlap the synthetic image CP1 (STEP S104). Therefore, the user may arbitrarily operate the icons for remote control with fingers.

Next, the mobile terminal 1 determine whether the sensor unit 15 has detected any impact (STEP S105). Impacts on the mobile terminal 1 are determined, for example, on the basis of detection signals representing the degree of acceleration of the mobile terminal 1, the level of ambient sound, the levels of operations on the operation unit 12, and so on, acquired by the sensor unit 15.

In the case where an impact has been detected ("Yes" in STEP S105), the mobile terminal 1 transmits a stop signal for the vehicle 5, to the vehicle control device 3 (STEP S106). In this case, if the vehicle 5 is traveling, traveling of the vehicle 5 is stopped. The stop signal for the vehicle 5 is stored in advance, for example, in the storage unit 17 or the like.

Next, the mobile terminal 1 determines whether any input based on a user's operation on the operation unit 12 has been received (STEP S107). In the case where any input based on an operation on the operation unit 12 has not been received ("No" in STEP S107), the mobile terminal 1 returns to STEP S103, and carries on receiving and displaying of a synthetic image CP1.

In the case where an input based on an operation on the operation unit 12 has been received ("Yes" in STEP S107), the mobile terminal 1 generates a control signal for the vehicle 5 on the basis of the operation on the operation unit 12 by the signal generating unit 163, and transmits the control signal to the vehicle 5 (STEP S108). Therefore, the use may perform remote control on the vehicle 5.

Next, the mobile terminal 1 determines whether an operation for turning off remote control on the vehicle 5 has been performed by the user (STEP S109). The user may end remote control on the vehicle 5 by operating the icon 12h for ending remote control on the vehicle 5. In the case where an operation for turning off remote control has not been performed ("No" in STEP S109), the mobile terminal 1 returns to STEP S103, and carries on receiving and displaying of a synthetic image CP1.

In the case where an operation for turning off remote control has been performed ("Yes" in STEP S109), the mobile terminal 1 transmits a control signal for canceling the constant-velocity traveling, to the vehicle control device 3 of the vehicle 5 (STEP S110). As a result, the traveling velocity of the vehicle 5 set to be constant (at a predetermined low velocity) during remote control according to the corresponding flow is canceled. Then, the processing flow shown in FIG. 6 ends.

As described above, the mobile terminal 1 of the present example which is a remote vehicle control device displays synthetic images CP1 having the images of the operation unit 12 thereon, on the display unit 11, and transmits control signals based on operations performed on the operation unit 12, to the vehicle 5, and transmits the control signal for stopping to the vehicle 100 if the sensor unit 15 detects any impact. According to this configuration, in the case where the user wants to stop the vehicle 5 as soon as possible, the user may immediately stop the vehicle 5 without finding the "STOP" icon 12h related to stopping of the vehicle 5. Further, even if the user drops the mobile terminal 1, on the basis of the dropping impact, it is possible to immediately stop the vehicle 5. In other words, it is possible to improve convenience and operability in remote control on the vehicle 5.

However, the mobile terminal may be configured to transmit the control signal for stopping to the vehicle 5 not only in the case where an impact has been detected, but also in the case where an operation different from predetermined operations has been detected. In this case, on the basis of various operations different from the predetermined operations, it is possible to stop the vehicle 5.

Also, in the case of transmitting a control signal related to traveling of the vehicle 5, the mobile terminal 1 fixes any one of the traveling velocity and the traveling distance. According to this configuration, it is possible to perform setting such that the vehicle 5 travels at a predetermined low velocity during remote control. Also, it is possible to perform setting such that the vehicle 5 may travel up to a predetermined short distance during remote control. Therefore, safety during remote control improves, and it is possible to improve convenience in remote control on the vehicle 5.

Second Example 5-2. Second Example

Figure 7:
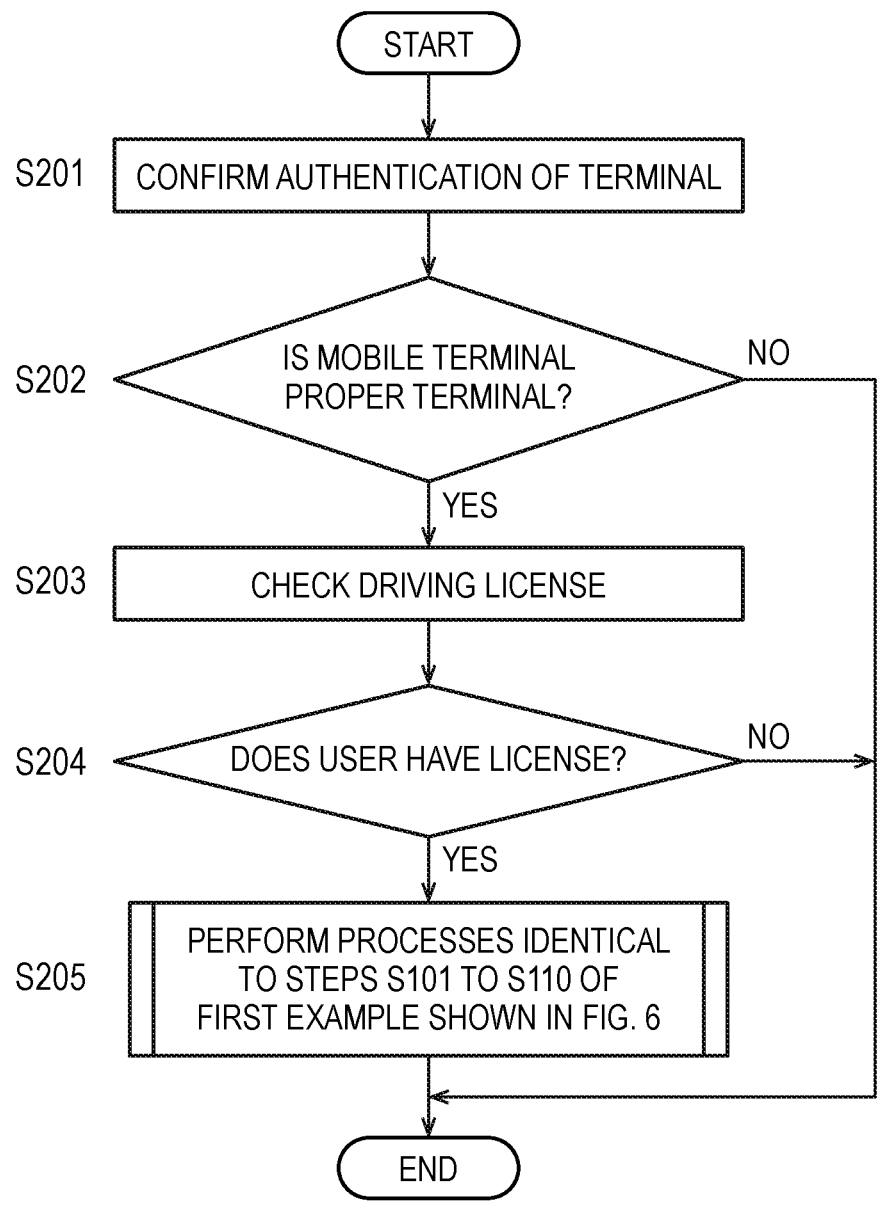
FIG. 7 is a flow chart illustrating another example of the flow of processing related to remote vehicle control according to a second example.

FIG. 7 is a flow chart illustrating an example of the flow of processing related remote vehicle control according to a second example. The processing which is related to remote control on the vehicle 5 and is performed by the mobile terminal 1 of the second example will be described with reference to FIG. 7.

For example, if the mobile terminal 1 is operated by the user, and receives a remote control start instruction from the operation unit 12, the processing of the mobile terminal 1 related to remote control on the vehicle 5 is started ("START" of FIG. 7). Remote control on the vehicle 5 is started when the vehicle 5 is stopped.

Next, the mobile terminal 1 performs confirmation of authentication of the mobile terminal 1 (STEP S201). The authentication unit 164 refers to the specific information for specifying the mobile terminal 1, stored in the storage unit 17 in advance.

Next, the mobile terminal 1 determines whether the mobile terminal is a proper terminal capable of remote control on the vehicle 5 (STEP S202). The authentication unit 164 determines whether the mobile terminal 1 has been permitted to control the vehicle 5, on the basis of the specific information of the mobile terminal 1. In the case where the mobile terminal 1 is not a proper terminal for control on the vehicle 5 ("No" in STEP S202), the processing flow shown in FIG. 7 is ended.

If it is authorized that the mobile terminal 1 is a proper terminal for control on the vehicle 5 ("Yes" in STEP S202), the mobile terminal 1 performs driving license checking (STEP S203). In this case, the authentication unit 164 may discriminate the license on the basis of the driving license of the user imaged by a camera 13. Alternatively, the authentication unit 164 may discriminate the driving license on the basis of the face of the user imaged by the camera 13 and the face photo on the driving license.

Next, the mobile terminal 1 determines whether the user has a driving license (STEP S204). In the case where the user does not have a driving license ("No" in STEP S204), the processing flow shown in FIG. 7 is ended.

If it is determined that the user has a driving license ("Yes" in STEP S204), the subsequent detailed processes related to control on the vehicle 5 are performed (STEP S205); however, since they are identical to STEP S101 to STEP S110 shown in FIG. 6 described in the first example, a description thereof will not be made.

As described above, the mobile terminal 1 of the present example which is a remote vehicle control device has the authentication unit 164 for determining whether control of the mobile terminal 1 on the vehicle 5 has been permitted. According to this configuration, in the mobile terminal 1, it is possible to perform authentication related to permission or prohibition of control on the vehicle 5. Therefore, it is possible to allow only the proper terminal to control the vehicle 5, so safety in remote control improves. In other words, it is possible to convenience in remote control on the vehicle 5.

Also, the authentication unit 164 permits the user to operate the operation unit 12, on the basis of the driving license imaged by the camera 13. According to this configuration, it becomes possible to easily determine whether the user has a driving license. Therefore, it is possible to improve safety in remote control on the vehicle 5.

Also, the authentication unit 164 discriminates the driving license on the basis of the user's face imaged by the camera 13 and the face photo on the driving license. According to this configuration, it becomes possible to easily determine whether the user is the owner of the driving license. Therefore, it is possible to further more improve safety in remote control on the vehicle 5.

Third Example 5-3. Third Example

Figure 8:
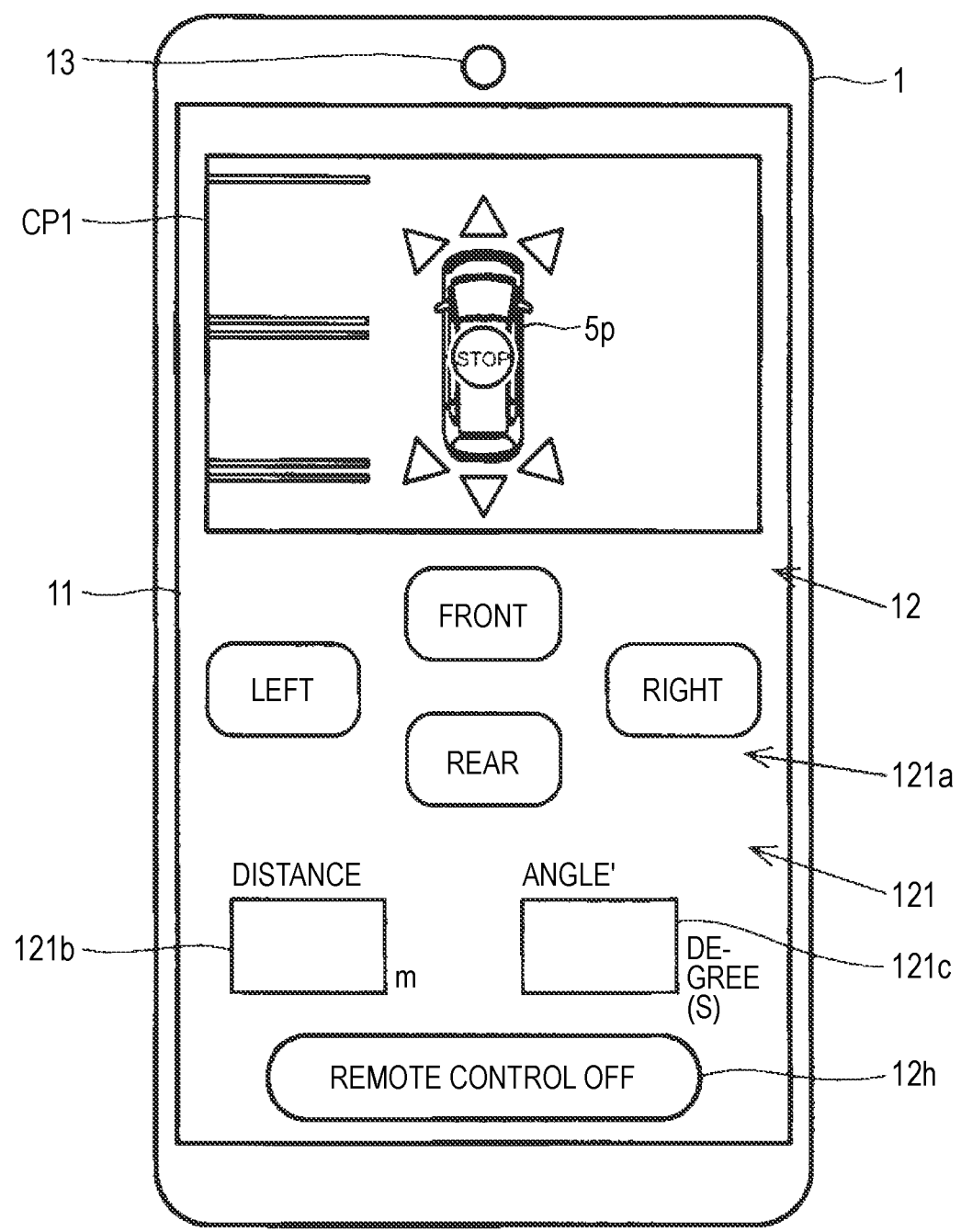
FIG. 8 is a schematic diagram illustrating a mobile terminal displaying a synthetic image and an operation unit according to a third example.

FIG. 8 is a schematic diagram illustrating the mobile terminal 1 displaying a synthetic image CP1 and the operation unit 12 according to a third example. The mobile terminal 1 of the third example displays the plurality of icons related to remote control on the vehicle 5, as the operation unit 12, on the screen of the display unit 11, so as to overlap the synthetic image CP1.

Further, the mobile terminal 1 disposes a numeric-value input section 121 of the operation unit 12 below the synthetic image CP1. The numeric-value input section 121 includes direction indicator icons 121a, a distance input section 121b, and an angle input section 121c. However, the arrangement of the synthetic image CP1 and the numeric-value input section 121 in the vertical direction may be changed.

As the direction indicator icons 121a, for example, four icons indicating four directions, the front side, the rear side, the left side, and the right side of the vehicle 5 are disposed. The user may select an icon indicating a direction in which the user wants to move the vehicle 5. As the distance input section 121b, for example, a text box is disposed. The user may input a numeric value representing a distance by which the user wants to move the vehicle 5. As the angle input section 121c, for example, a text box is disposed. The user may input a numeric value representing an angle at which the user wants to move the vehicle 5. However, in each the distance input section 121b and the angle input section 121c, a plurality of predetermined numeric values may be displayed such that the user may arbitrarily select one from the plurality of numeric values.

As described above, the operation unit 12 of the mobile terminal 1 of the present example receives operations for the vehicle 5 using inputting of numeric values. According to this configuration, it is possible to precisely set the movement direction, the movement distance, and the movement angle for the vehicle 5 by inputting numeric values, to perform remote control. Therefore, it is possible to perform more precise control on the vehicle 5, and it is possible to improve operability in remote control on the vehicle 5.

Fourth Example 5-4. Fourth Example

Figure 9:
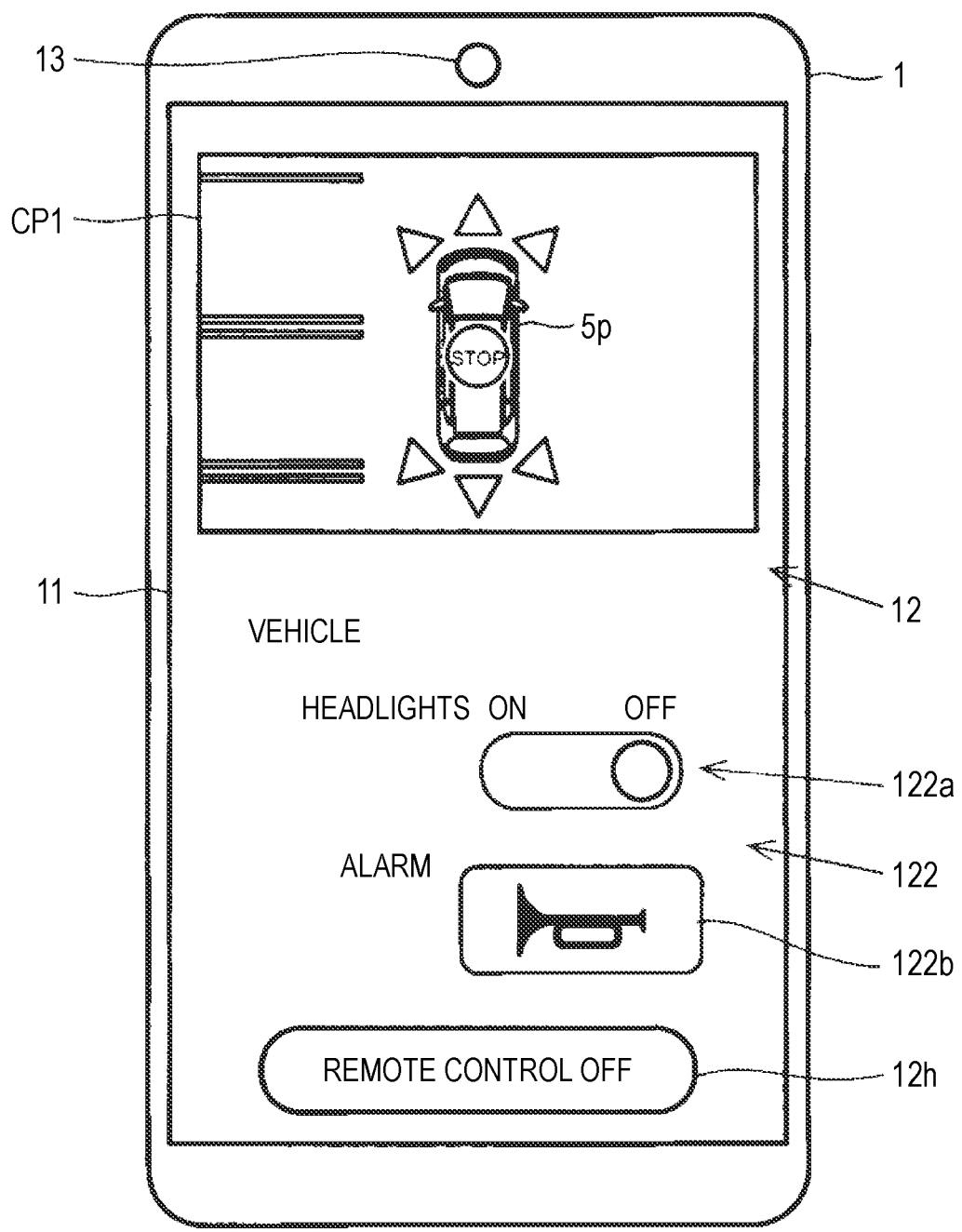
FIG. 9 is a schematic diagram illustrating a mobile terminal displaying a synthetic image and an operation unit according to a fourth example.

FIG. 9 is a schematic diagram illustrating the mobile terminal 1 displaying a synthetic image CP1 and the operation unit 12 according to a fourth example. The mobile terminal 1 of the fourth example displays the plurality of icons related to remote control on the vehicle 5, as the operation unit 12, on the screen of the display unit 11, so as to overlap the synthetic image CP1.

Further, the mobile terminal 1 disposes a device operation section 122 of the operation unit 12 below the synthetic image CP1. The device operation section 122 includes a headlight switch 122a and an alarm device icon 122b. However, the arrangement of the synthetic image CP1 and the device operation section 122 in the vertical direction may be changed.

As the headlight switch 122a, for example, a slide switch is disposed. The user may operate the slide switch to switch on and off the headlights of the vehicle 5. As the alarm device icon 122b, for example, an icon representing that the alarm device is on is disposed. If the alarm device icon 122b is pressed, the alarm device of the vehicle 5 operates, and emits a warning sound toward the outside.

As described above, the operation unit 12 of the mobile terminal 1 of the present example receives operations for the headlights of the vehicle 5. According to this configuration, even if it gets dark around the vehicle 5 in the course of remote control on the vehicle, it is possible to brighten the surrounding area. Therefore, it is possible to improve operability in remote control on the vehicle 5. Further, it is possible to improve safety in remote control.

Also, the operation unit 12 receives operations for the alarm device of the vehicle 5. According to this configuration, if people, bicycles, other vehicles, and so on approach the vehicle 5 in the course of remote control on the vehicle 5, it is possible to emit a warning sound toward them. Therefore, safety during remote control improves, and it is possible to improve convenience in remote control on the vehicle 5.

Fifth Example 5-5. Fifth Example

Figure 10:
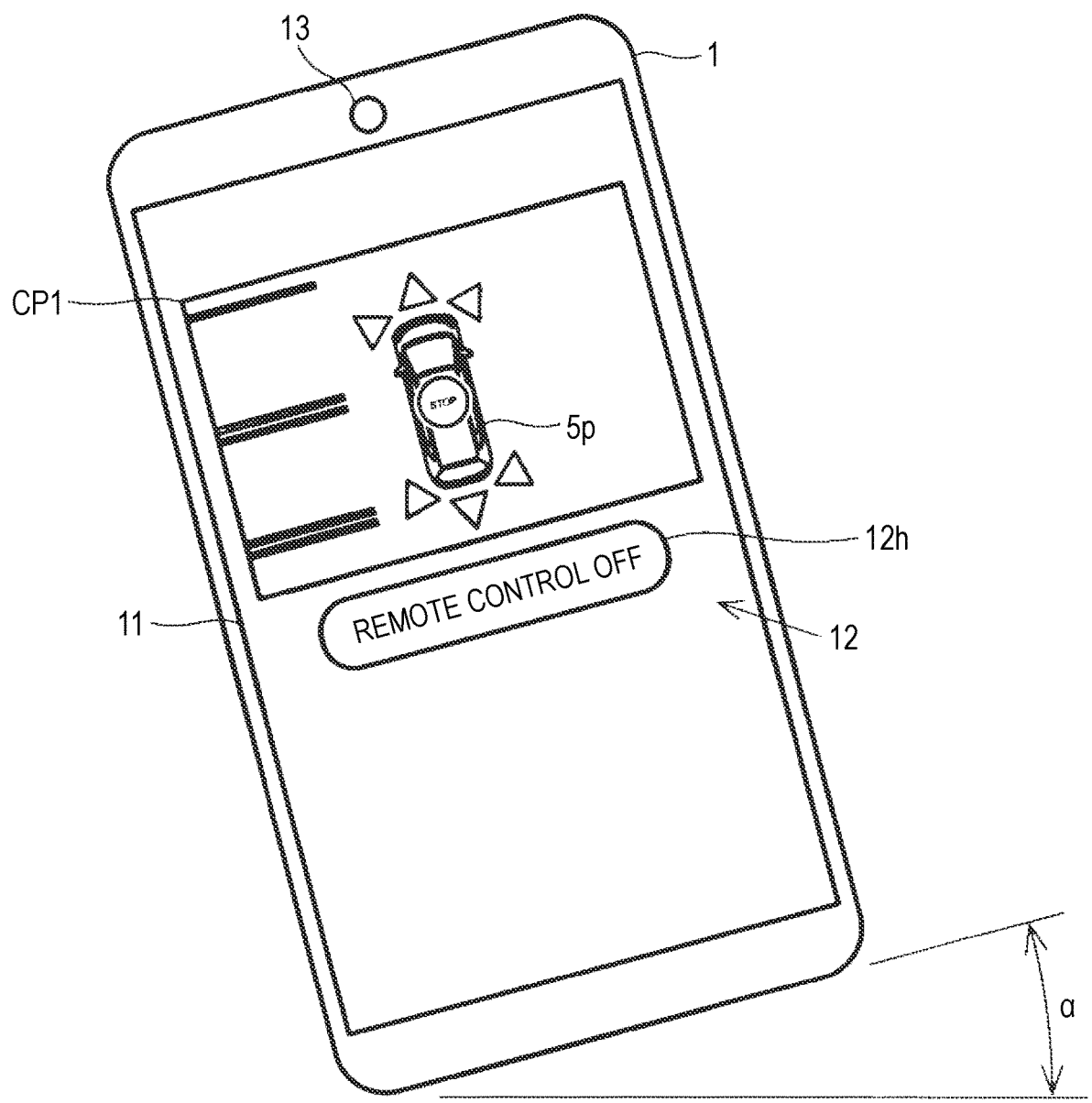
FIG. 10 is a schematic diagram illustrating a mobile terminal displaying a synthetic image according to a fifth example.

FIG. 10 is a schematic diagram illustrating the mobile terminal 1 displaying a synthetic image CP1 according to a fifth example. The mobile terminal 1 of the firth example displays the plurality of icons related to remote control on the vehicle 5, as the operation unit 12, on the screen of the display unit 11, so as to overlap the synthetic image CP1.

Further, the mobile terminal 1 derives a steering angle for the vehicle 5, on the basis of the tilt of the mobile terminal 1. The sensor unit 15 detects the tilt of the mobile terminal 1 by the tilt sensor.

For example, if the mobile terminal 1 is tilted at an angle $\alpha$ such that the upper part looks toward the left side as shown in FIG. 10, the mobile terminal 1 derives a steering angle for the vehicle 5 on the basis of the angle $\alpha$. Also, the mobile terminal 1 may be configured to control the vehicle 5 such that the vehicle starts to travel, if the mobile terminal is tilted such that the upper part looks toward the front side.

According to the configuration of the mobile terminal 1 of the present example, the user may remotely control the vehicle 5 as if the user operates the steering wheel. Therefore, it is possible to improve the convenience and operability in remote control on the vehicle 5.

Sixth Example 5-6. Sixth Example

Figure 11:
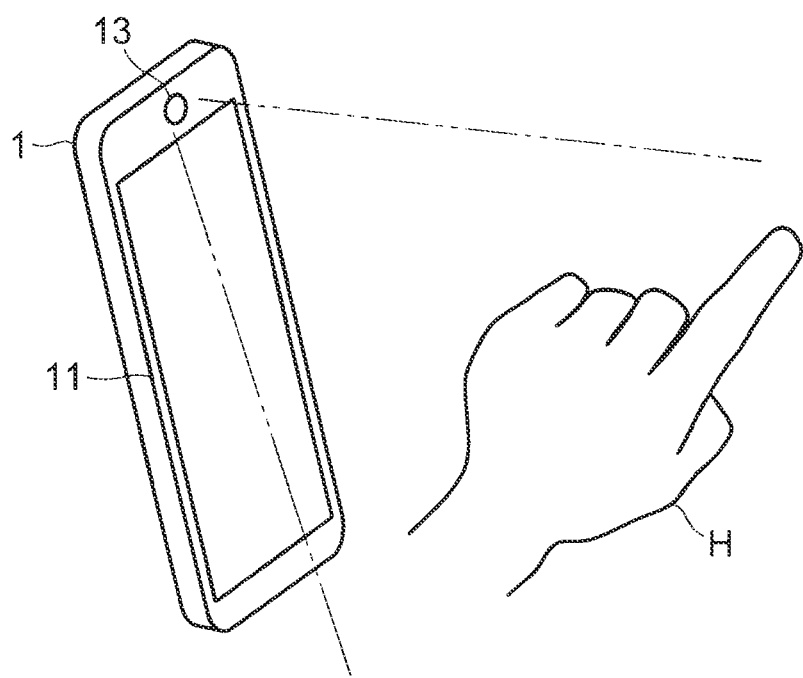
FIG. 11 is a schematic diagram illustrating a remote vehicle control method of a sixth example (Example 1)

FIG. 11 is a schematic diagram illustrating a remote control method for the vehicle 5 according to a sixth example (Example 1). The mobile terminal 1 of the sixth example has an operation mode for receiving operations based on gestures of the user. The mobile terminal 1 images gestures which the user makes, for example, with a hand H and so on, by the cameras 13.

The operation discriminating unit 162 discriminates operation contents for the vehicle 5, on the basis of user's gestures imaged by the cameras 13. Images of reference gestures for discriminating the operation contents are stored in the storage unit 17 in association with the operation contents, in advance. The operation discriminating unit 162 compares a user's gesture imaged by a camera 13 during remote control, with the reference gestures, for example, by a system such as pattern matching, to discriminate the operation content. Then, the signal generating unit 163 generates a control signal for the vehicle 5 based on the operation related to the corresponding gesture.

Figure 12:
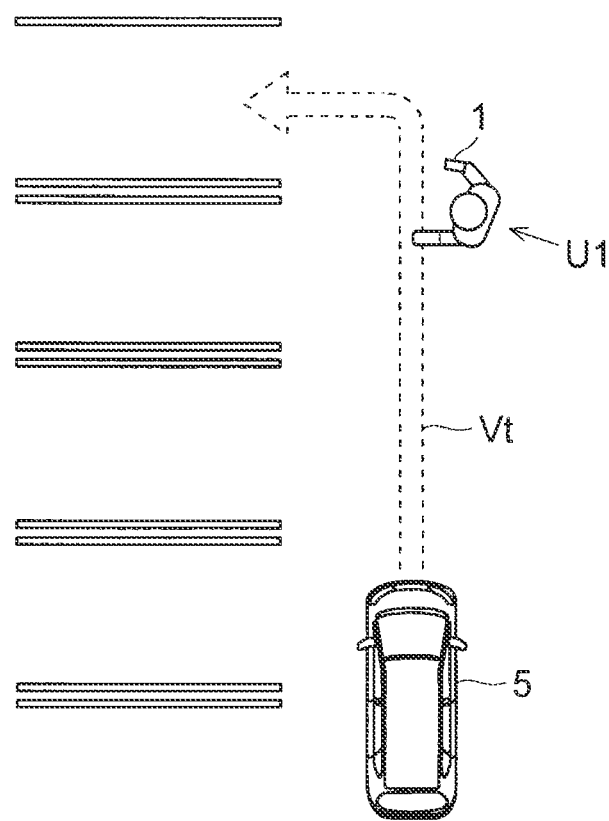
FIG. 12 is a schematic diagram illustrating a remote vehicle control method of the sixth example (Example 2)

However, user's gestures may be imaged by the on-board cameras of the vehicle 5. FIG. 12 is a schematic diagram illustrating a remote control method for the vehicle 5 according to the sixth example (Example 2). In this case, the operation discriminating unit 162 discriminates operation contents for the vehicle 5, on the basis of gestures of a user U1 imaged by the on-board cameras 41 to 44.

For example, if the user U1 shows a V sign or the like with fingers for an on-board camera, the operation discriminating unit 162 discriminates the operation content for the vehicle 5, on the basis of the V sign included in the image acquired by the on-board camera. Also, for example, information representing that the V sign is a signal instructing to start an operation mode for instructing to travel along a traveling track Vt for the vehicle 5 on the basis of a gesture of the user U1 is stored in advance. Subsequently, the user U1 instructs to travel along the traveling track Vt for the vehicle 5, by tracing the track on the actual road. In the case of tracing the traveling track Vt for the vehicle 5 on the actual road, the user may perform tracing slightly apart from the road surface. However, if the user traces the traveling track on the road surface, the accuracy improves.

According to the configuration of the mobile terminal 1 of the present example, the user may remotely control the vehicle 5 by gestures, hand signals, and so on. Therefore, it is possible to improve the convenience and operability in remote control on the vehicle 5.

Seventh Example 5-7. Seventh Example

Figure 13:
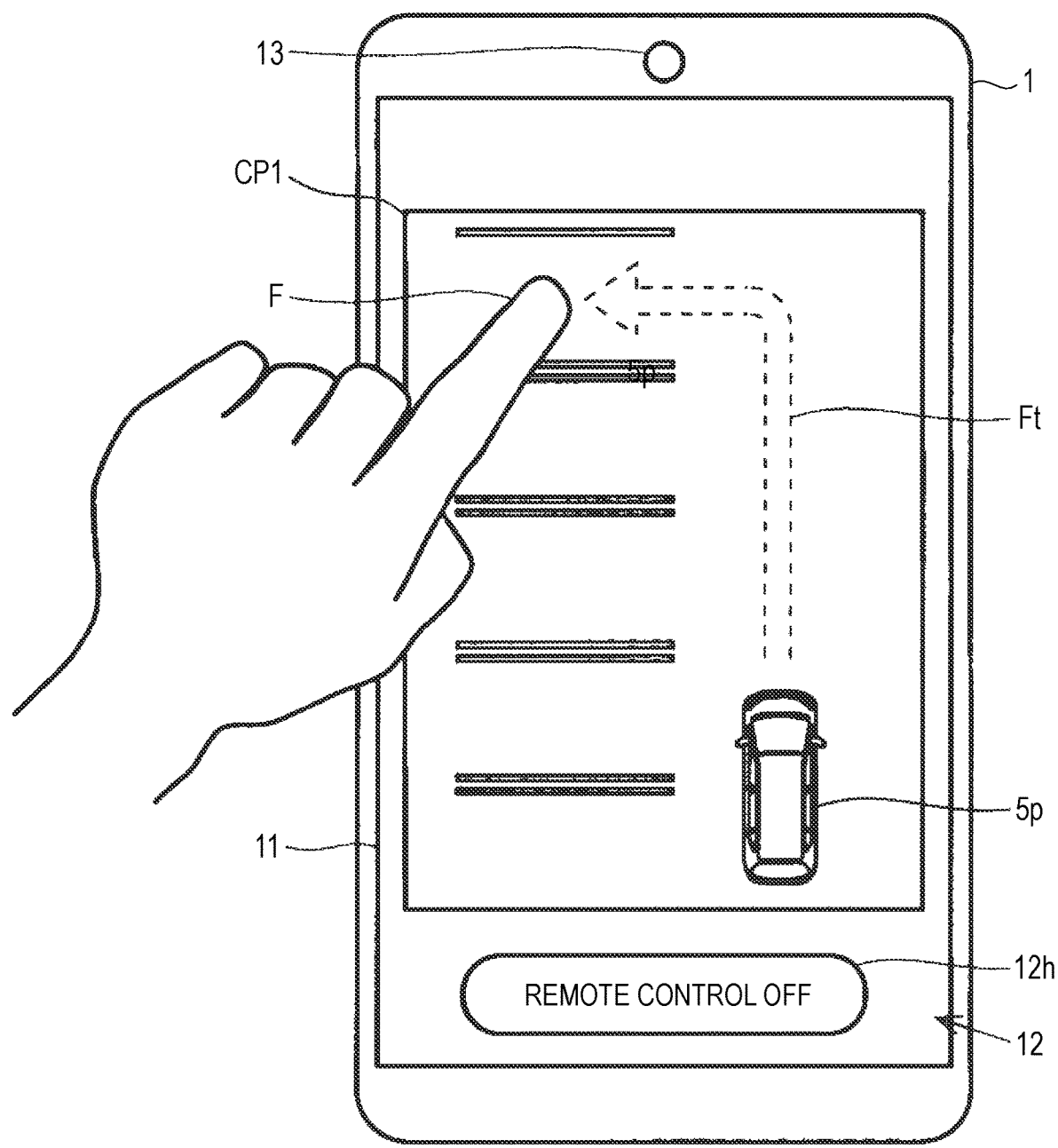
FIG. 13 is a schematic diagram illustrating a remote vehicle control method of a seventh example.

FIG. 13 is a schematic diagram illustrating a remote control method for the vehicle 5 according to a seventh example. The mobile terminal 1 of the seventh example has an operation mode for receiving user's operations related to traveling routes for the vehicle 5.

In this operation mode, the mobile terminal 1 displays a synthetic image CP1 on the screen of the display unit 11. It is desirable that the synthetic image CP1 should be displayed in a relatively large size such that the user may easily perform an operation. It is desirable that the ions related to remote control on the vehicle 5 should not be displayed.

The user moves a finger F on the screen of the display unit 11 from the image 5p of the vehicle 5 to a desired end point. The operation unit 12 which is a touch panel receives the operation track Ft of the finger F as the traveling route for the vehicle 5. Then, the signal generating unit 163 generates a control signal related to the traveling route for the vehicle 5, on the basis of the operation track Ft.

Also, it is preferable that an image for drawing an operation track Ft should be an image acquired by the on-board cameras. In images acquired by the on-board cameras, positions relative to the vehicle 5 have been determined. Therefore, the accuracy of derivation of traveling routes for the vehicle 5 improves. Alternatively, as an image for drawing an operation track Ft, an image acquired by a camera 13 of the mobile terminal 1 may be used. For example, in the case of an image which is acquired by the mobile terminal 1, if a track on the actual road corresponding to an operation track Ft is imaged by a camera 13 of the mobile terminal 1, and the feature of the road (the feature of its shape) is recognized, the mobile terminal performs control to move the vehicle while matching the image acquired by the mobile terminal with road images of the on-board cameras.

As described above, the operation unit 12 of the mobile terminal 1 of the present example receives an operation track Ft related to a traveling route for the vehicle 5. The signal generating unit 163 generates a control signal related to the traveling route for the vehicle 5, on the basis of the operation track Ft. According to this configuration, it is possible to move the vehicle 5 to a desired location, without performing delicate operations using the icons, inputting of numeric values, and so on. Therefore, it is possible to improve the convenience and operability in remote control on the vehicle 5.

Also, on the basis of the speed at which an operation track Ft is drawn, the traveling velocity of the vehicle 5 may be changed. For example, if the user moves the finger F relatively slowly when drawing an operation track Ft, the traveling velocity of the vehicle 5 is set to a velocity lower than a predetermined low velocity.

More specifically, for example, on the basis of a ratio designated with respect to the speed at which an operation track Ft are drawn, the traveling velocity of the vehicle 5 is set. The user may arbitrarily set an appropriate ratio as the ratio of the traveling velocity of the vehicle 5 to the speed at which an operation track Ft is drawn. For example, in the case of an operation track Ft which is traced on the screen of the display unit 11, 0.2 may be set as the initial value of the ratio to the speed of drawing on a display image (an image of the vehicle 5, the road, and so on) in advance. It is preferable to designate a small ratio.

According to this configuration, it is possible to arbitrarily set the traveling velocity of the vehicle 5 on the basis of the speed at which an operation track Ft is drawn. Therefore, it is possible to improve convenience in remote control on the vehicle 5.

Alternatively, the traveling velocity of the vehicle 5 may be changed on the basis of the thicknesses of operation tracks Ft. For example, when drawing an operation track Ft, if the user draws the operation track Ft thinly, i.e. if the user lightly touches the screen with the finger F, the traveling velocity of the vehicle 5 is set to a velocity lower than a predetermined low velocity. According to this configuration, it is possible to arbitrarily set the traveling velocity of the vehicle 5 on the basis of the thickness of an operation track Ft. Therefore, it is possible to improve convenience in remote control on the vehicle 5.

Eighth Example 5-8. Eighth Example

Figure 14:
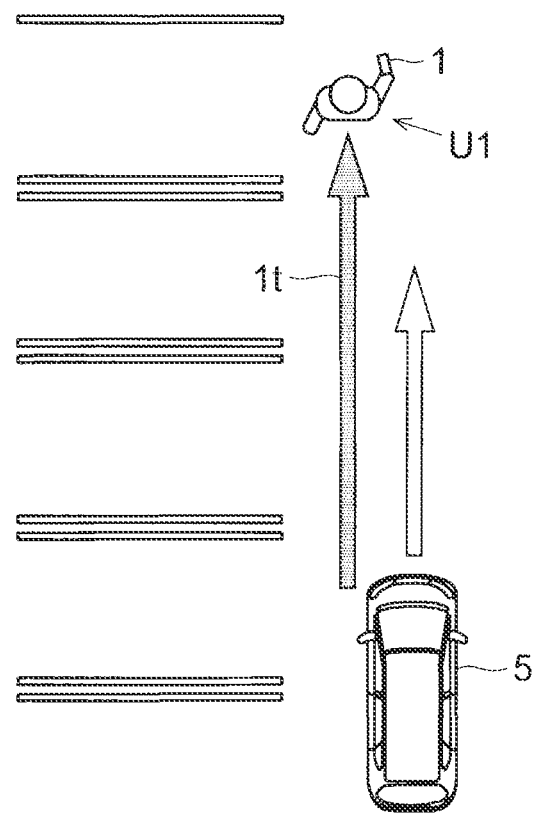
FIG. 14 is a schematic diagram illustrating a remote vehicle control method of an eighth example.

FIG. 14 is a schematic diagram illustrating a remote control method for the vehicle 5 according to an eighth example. The mobile terminal 1 of the eighth example has an operation mode for controlling the vehicle 5 on the basis of the track of movement of the mobile terminal 1.

In this operation mode, the user U1 carrying the mobile terminal 1 moves from a location in the vicinity of the actual vehicle 5 to a desired end point. At this time, in the mobile terminal 1, the sensor unit 15 acquires information on the location of the mobile terminal 1. The sensor unit 15 sequentially acquires information on the location of the mobile terminal 1 at predetermined intervals, for example, using the GPS. In this way, it is possible to derive a movement track 1t of the mobile terminal 1.

The signal generating unit 163 generates a control signal related to the traveling route of the vehicle 5, on the basis of the movement track 1t of the mobile terminal 1. In this case, a signal representing that traveling along the movement track 1t of the mobile terminal 1 which is a traveling route for the vehicle 5 has been instructed from the mobile terminal 1 is transmitted from the mobile terminal 1 to the vehicle control device 3. Therefore, the accuracy of recognition of the type of the operation improves. Further, for example, when traveling along the movement track 1t of the mobile terminal 1 is instructed from the mobile terminal 1, the screen of the display unit 11 is blinked in a predetermined pattern. Therefore, it is possible to further improve discrimination related to the state where traveling is being instructed from the mobile terminal 1.

Also, the vehicle 5 may travel with movement of the user U1 carrying the mobile terminal 1. Alternatively, the vehicle 5 may start to travel on the basis of an instruction of the user U1 after the user U1 carrying the mobile terminal 1 moves to a desired end point.

According to the configuration of the mobile terminal 1 of the present example, it is possible to move the vehicle 5 to a desired location, without performing operations using the icons, operations of inputting numeric values on the screen of the display unit 11, an operation of drawing a track, and the like on the screen of the display unit 11. Therefore, it is possible to improve the convenience and operability in remote control on the vehicle 5.

Ninth Example

5-9. Ninth Example

Figure 15:
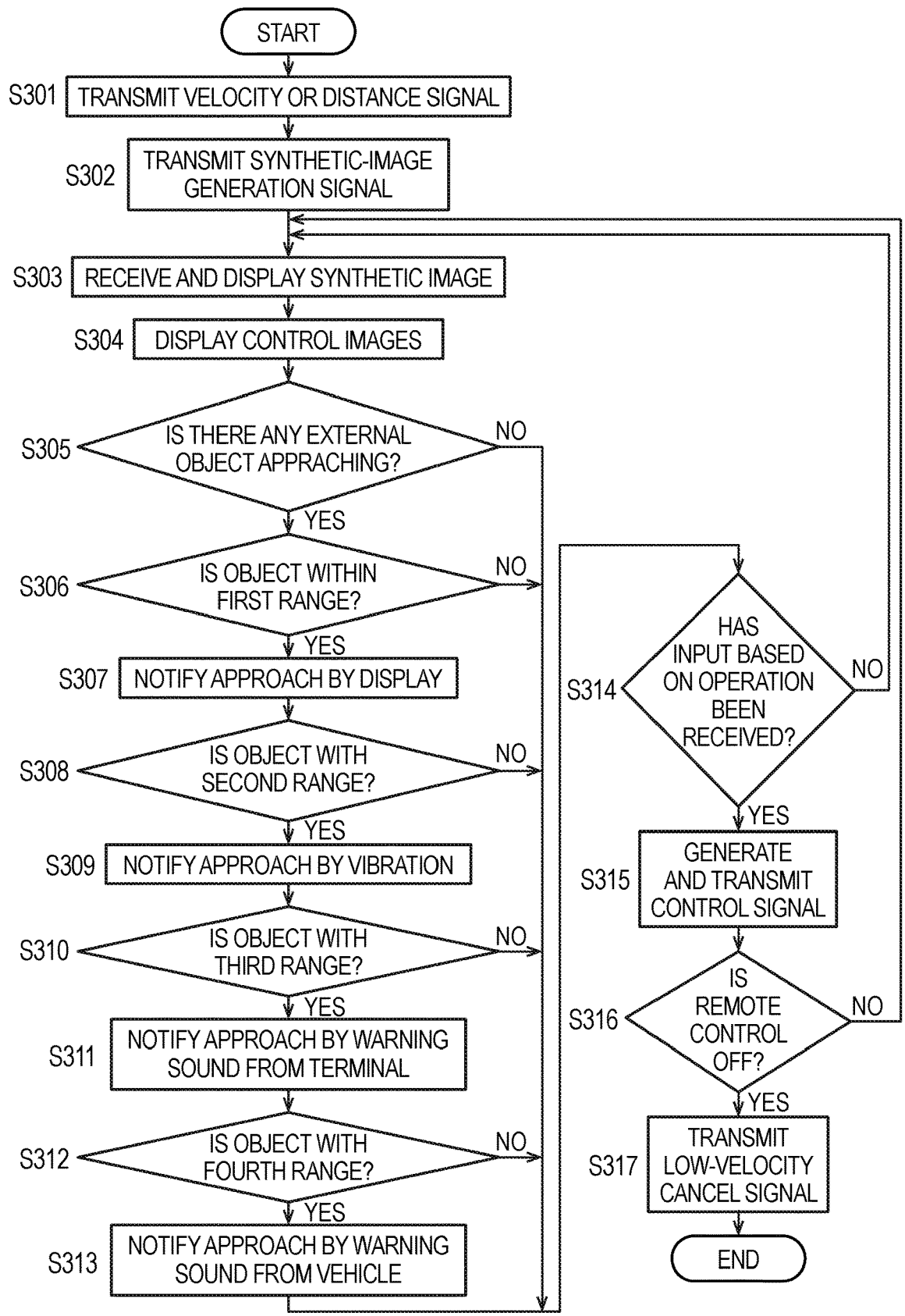
FIG. 15 is a flow chart illustrating an example of the flow of processing related to remote vehicle control according to a ninth example.
Figure 16:
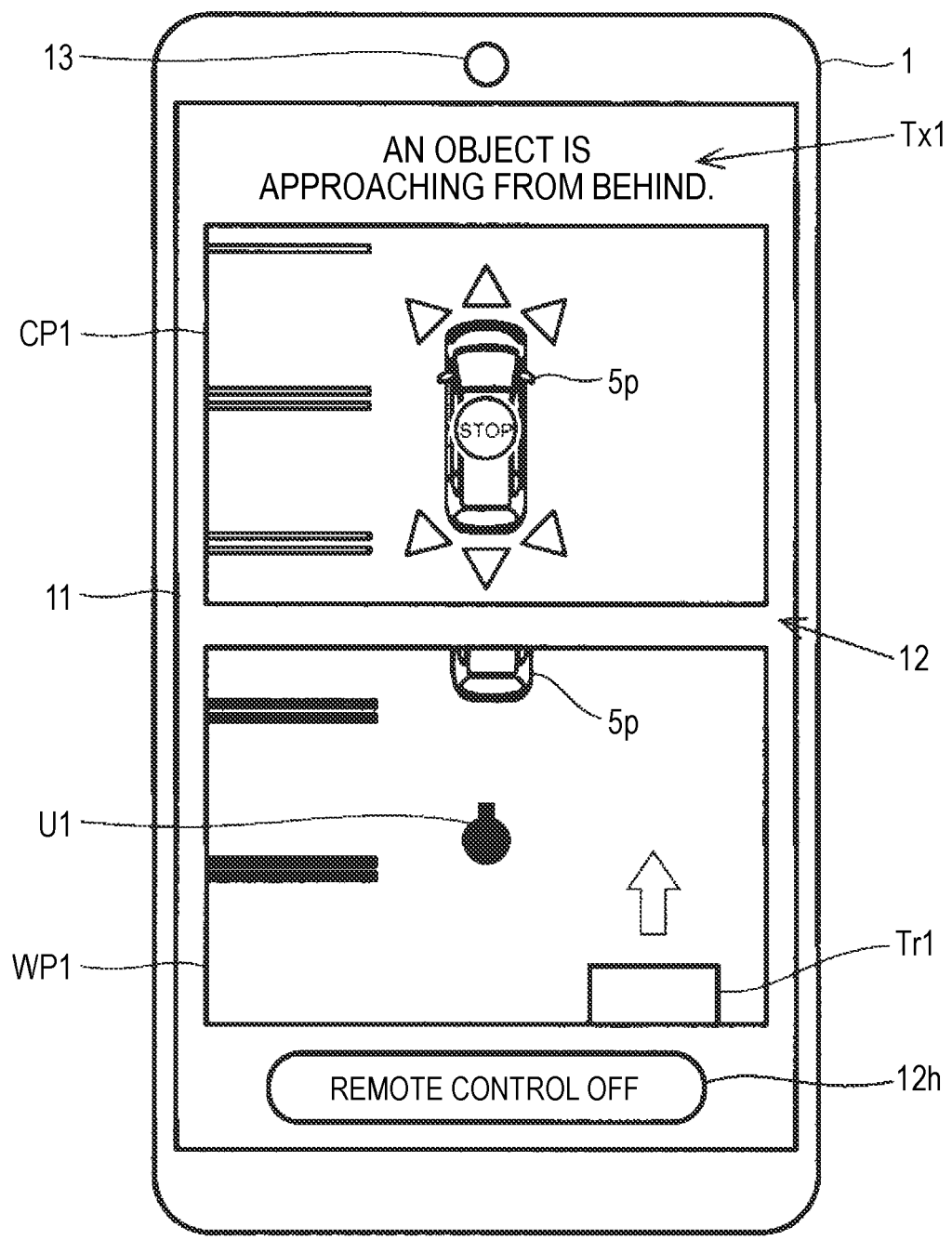
FIG. 16 is a schematic diagram illustrating a mobile terminal displaying a synthetic image according to the ninth example (Example 1)
Figure 17:
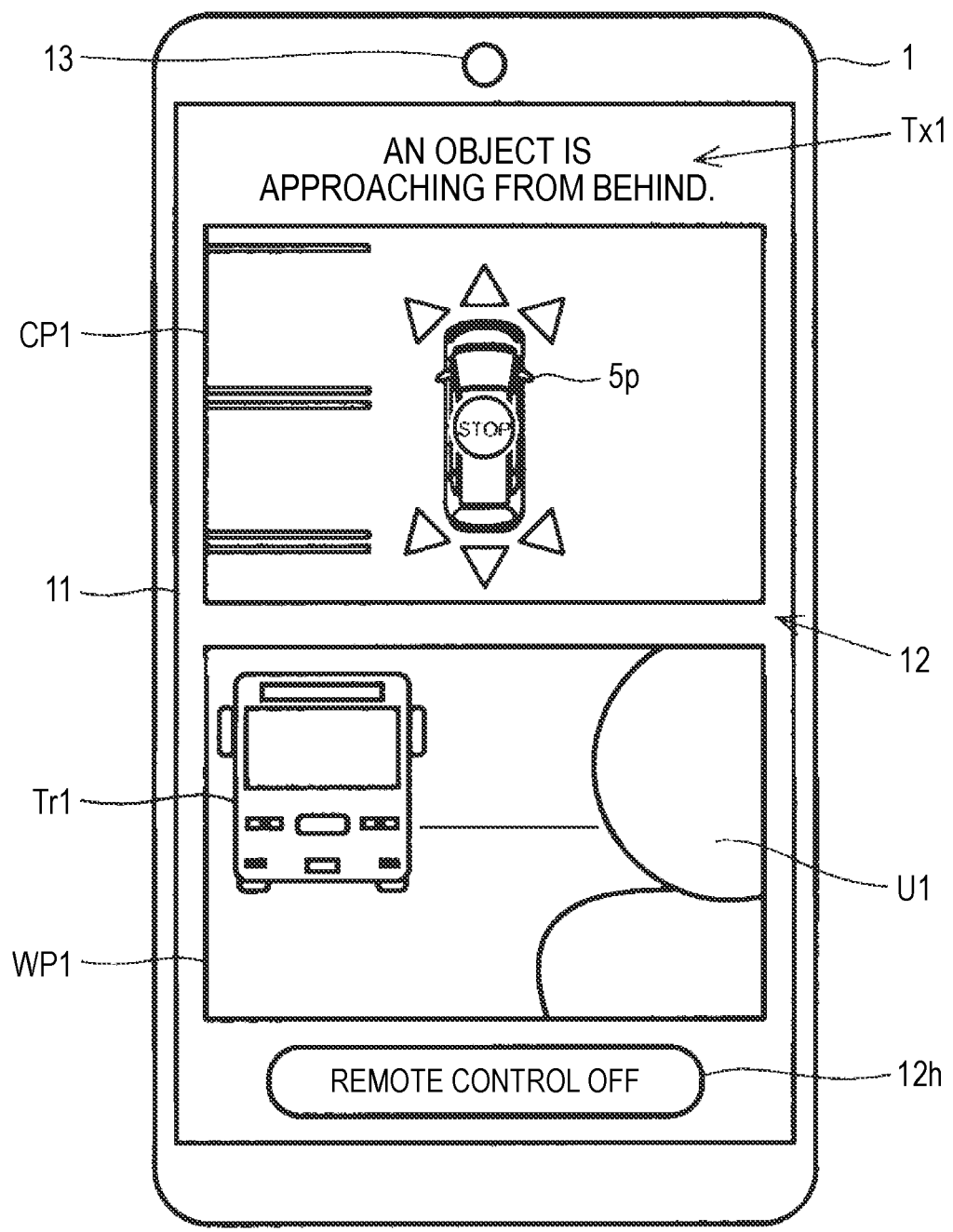
FIG. 17 is a schematic diagram illustrating the mobile terminal displaying a synthetic image according to the ninth example (Example 2).

FIG. 15 is a flow chart illustrating an example of the flow of processing related to remote vehicle control according to a ninth example. FIG. 16 is a schematic diagram illustrating the mobile terminal 1 displaying a synthetic image CP1 according to the ninth example (Example 1). FIG. 17 is a schematic diagram illustrating the mobile terminal 1 displaying a synthetic image CP1 according to the ninth example (Example 2). The processing which is related to remote control on the vehicle 5 and is performed by the mobile terminal 1 of the ninth example will be described with reference to the processing flow of FIG. 15, and FIG. 16 and FIG. 17. However, processes identical to those of the processing flow of FIG. 6 described in the first example and the processing flow of FIG. 7 described in the second example may not be described in detail.

For example, if the mobile terminal 1 is operated by the user, and receives a remote control start instruction from the operation unit 12, the processing of the mobile terminal 1 related to remote control on the vehicle 5 is started ("START" of FIG. 15). Remote control on the vehicle 5 is started when the vehicle 5 is stopped.

Next, with respect to the traveling velocity of the vehicle 5, the mobile terminal 1 transmits a constant-velocity control signal to the vehicle control device 3 of the vehicle 5 (STEP S301). Subsequently, the mobile terminal 1 transmits a control signal related to synthetic-image generation to the image processing device 2 of the vehicle 5 (STEP S302). Next, the mobile terminal 1 receives a synthetic image from the image processing device 2, and displays the synthetic image on the display unit 11 (STEP S303). Subsequently, the mobile terminal 1 displays the icons and so on (the operation unit 12) which are function images related to control on the vehicle 5, on the display unit 11, so as to overlap the synthetic image (STEP S304).

Next, in the vehicle 5, whether there is any external object, such as people, animals, vehicles, or other objects, approaching the vehicle 5 or the user remotely controlling the vehicle 5 is checked by the sensor unit 51 or the imaging unit 4, and whether approach of any object has been detected is determined (STEP S305). In the vehicle 5, for example, if start of remote control using the mobile terminal 1 is confirmed by receiving the control signal related to synthetic-image generation or the like from the mobile terminal 1, a monitoring mode is started, and monitoring whether there is any external object approaching the vehicle 5 and the user is started. In detection of people, animals, vehicles, and other objects existing around the vehicle 5 and the user, they are discriminated on the basis of the detection signals of the ultrasonic sensor, the light sensor, and the radar included in the sensor unit 51, or image recognition using images of the on-board cameras 41 to 44.

With respect to detection of objects approaching the vehicle 5 and the user, more specifically, if an object enters a predetermined range from the vehicle 5 or the user, the vehicle 5 predicts that the object would come into contact with the vehicle 5 or the user. For example, a plurality of ranges according to the distance from the vehicle 5 or the user is set as predetermined ranges from the vehicle 5 or the user. Ranges from the vehicle 5 or the user may be arbitrarily set. For example, it is possible to set a range to 10 m in the radial direction as a first range, and set a range to 7 m in the radial direction as a second range, and set a range to 5 m in the radial direction as a third range, and set a range to 3 m in the radial direction as a fourth range.

In the case where approach of an external object to the vehicle 5 or the user has been detected ("Yes" in STEP S305), whether the object approaching the vehicle 5 or the user is within the first range is determined (STEP S306). In the case where the object is within the first range from the vehicle 5 or the user ("Yes" in STEP S306), approach of the object is notified by displaying the corresponding information on the display unit 11 of the mobile terminal 1 (STEP S307).

For example, as shown in FIG. 16, on the display unit 11 of the mobile terminal 1, a warning image WP1 for notifying approach of an object is displayed so as to be aligned with a synthetic image CP1 for remotely controlling the vehicle 5. For example, a warning image WP1 may be configured as a bird's eye view image based on images acquired by the on-board cameras 41 to 44, similarly to the synthetic image CP1. In a warning image WP1, for example, an image of the vehicle 5 which is remotely controlled by the mobile terminal 1, an image of the user U1 carrying the mobile terminal 1, and an image of an object Tr1 approaching the vehicle 5 and the user U1 from behind the vehicle 5 is included. Further, on the display unit 11, a text Tx1 representing that there is the object Tr1 approaching the vehicle 5 and the user U1 from behind is displayed.

Alternatively, for example, as shown in FIG. 17, on the display unit 11 of the mobile terminal 1, a warning image WP2 for notifying approach of an object is displayed so as to be aligned with a synthetic image CP1 for remotely controlling the vehicle 5. A warning image WP2 is configured with, for example, an image acquired by a camera 13 of the mobile terminal 1. In a warning image WP2, for example, an image of the user U1 carrying the mobile terminal 1, and an image of an object Tr1 approaching the vehicle 5 and the user U1 from behind the user U1 is included. Further, on the display unit 11, a text Tx1 representing that there is the object Tr1 approaching the vehicle 5 and the user U1 from behind is displayed.

However, the arrangement of a synthetic image CP1 and a warning image WP1 or a warning image WP2 in the vertical direction may be changed.

Next, whether the object approaching the vehicle 5 or the user is in the second range from the vehicle 5 or the user is determined (STEP S308). In the case where the object is within the second range from the vehicle 5 or the user ("Yes" in STEP S308), approach of the object is notified by vibration based on a vibration function of the mobile terminal 1 (STEP S309).

Next, whether the object approaching the vehicle 5 or the user is within a third range from the vehicle 5 or the user is determined (STEP S310). In the case where the object is within the third range from the vehicle 5 or the user ("Yes" in STEP S310), approach of the object is notified by emitting a warning sound from the mobile terminal 1 (STEP S311). The mobile terminal 1 emits the warning sound from the speaker of the sound input/output unit 14.

Next, whether the object approaching the vehicle 5 or the user is within a fourth range from the vehicle 5 or the user is determined (STEP S312). In the case where the object is within the fourth range from the vehicle 5 or the user ("Yes" in STEP S312), approach of the object is notified by emitting a warning sound from the vehicle 5 (STEP S313). In the vehicle 5, the alarm device operates, whereby the warning sound is emitted to the outside.

Also, in warning images WP2 which are acquired using the cameras 13 of the mobile terminal 1, as the distance to the object decreases, the image resolution increases. Therefore, it is possible to more accurately recognize approach of the object.

Next, the mobile terminal 1 determines whether any input based on a user's operation on the operation unit 12 has been received (STEP S314). The subsequent steps (STEP S315 to STEP S317) are identical to STEP S108 to STEP S110 shown in FIG. 6 described in the first example, so a description thereof will not be made below.

According to the configuration of the mobile terminal 1 of the present example, it is possible to notify the user remotely controlling the vehicle 5 of existence of objects approaching the vehicle 5 and the user. Therefore, safety during remote control improves, and it is possible to improve convenience in remote control on the vehicle 5.

Further, it is possible to switch between the methods of notifying the user, step by step, according to the distance from the vehicle 5 or the user. As the notifying methods, for example, display, vibration, and sound may be used. According to this configuration, the user may sensuously grasp the distance to each object approaching. As display for notifying approach of objects, besides text display, images which are acquired by the imaging unit 4 of the vehicle 5, and images which are acquired by the cameras 13 of the mobile terminal 1 may be used. Therefore, it is possible to further more improve convenience in remote control on the vehicle 5.

6. Others

Various technical features disclosed in this specification can be modified variously without departing from the spirit of the technical invention besides the embodiment described above. In other words, it should be understood that the embodiments described above are illustrative and non-restrictive in every respect. It should be understood that the scope of the present invention is defined by the terms of the claims, rather than the description above, and is intended to include any modifications within the scope and meaning equivalent to the terms of the claims. Also, some of the embodiment, the examples, and the modifications described above may be appropriately combined in an acceptable range.

Also, in the above-described embodiment, various functions are implemented in a software wise by computing of the CPUs according to the programs; however, at least some of those functions may be implemented by electrical hardware circuits. Also, conversely, some of functions which are implemented by hardware circuits may be implemented in a software wise.

What is claimed is:

1. A remote vehicle control device comprising:
    a hardware processor configured to
        receive synthetic images which show a surrounding area of a vehicle as seen from virtual viewpoints and each of which is generated based on a plurality of images acquired by a plurality of on-board cameras mounted on the vehicle, respectively,
        receive an operation for operating the vehicle, and
        generate control signals for the vehicle, based on the received operation;
    a display configured to display the synthetic images; and
    a sensor configured to detect impact based on at least one of (1) change in acceleration of the remote vehicle control device and (2) sound, wherein
        the control signals are transmitted to the vehicle, and when the sensor detects the impact, a control signal for stopping is transmitted to the vehicle,
        the hardware processor receives an operation track related to a traveling route of the vehicle,
        the hardware processor generates a control signal related to the traveling route of the vehicle, based on the operation track, and
        the remote vehicle control device changes a traveling velocity of the vehicle based on a thickness of the operation track.

2. The remote vehicle control device according to claim 1, wherein:
    in a case of transmitting control signals related to traveling of the vehicle, any one of traveling velocity and traveling distance is constant.

3. The remote vehicle control device according to claim 1, wherein
    the hardware processor is further configured to determine whether control of the remote vehicle control device on the vehicle has been permitted.

4. The remote vehicle control device according to claim 3, further comprising:
    a camera configured to image the surrounding area of the remote vehicle control device,
    wherein the hardware processor permits a user to perform the operation to operate the vehicle based on a driving license imaged by the camera.

5. The remote vehicle control device according to claim 4, wherein:
    the hardware processor discriminates the driving license based on the user's face imaged by the camera and a face photo on the driving license.

6. The remote vehicle control device according to claim 1, wherein:
    the hardware processor receives operations for the vehicle using inputting of numeric values.

7. The remote vehicle control device according to claim 1, wherein:
    the sensor detects a tilt of the remote vehicle control device, and derives a steering angle for the vehicle, based on the tilt.

8. The remote vehicle control device according to claim 1, further comprising:
    a camera configured to image the surrounding area of the remote vehicle control device; wherein
    the hardware processor is further configured to discriminate operation contents for the vehicle, based on gestures of a user imaged by the camera or the on-board cameras,
    wherein the hardware processor generates control signals based on operations for the vehicle related to the gestures.

9. The remote vehicle control device according to claim 1, wherein:
    the sensor acquires location information of the remote vehicle control device, and
    the hardware processor generates the control signal related to the traveling route of the vehicle based on a track of movement of the remote vehicle control device.

10. The remote vehicle control device according to claim 1, wherein the sensor detects the impact based on detected sound.

11. A remote vehicle control system comprising:
    the remote vehicle control device according to claim 1;

an image processing device configured to generate each of the synthetic images showing the surrounding area of the vehicle as seen from the virtual viewpoints, based on a plurality of images acquired by the plurality of on-board cameras mounted on the vehicle, respectively, and transmit the synthetic images to the remote vehicle control device; and a vehicle control device configured to receive the control signals for the vehicle from the remote vehicle control device, and control the vehicle based on the control signals.

12. A remote vehicle control method executed by a remote vehicle control device, the method comprising:

receiving synthetic images which show a surrounding area of a vehicle as seen from virtual viewpoints and each of which is generated based on a plurality of images acquired by a plurality of on-board cameras mounted on the vehicle, respectively;

displaying the synthetic images on a display of the remote vehicle control device;

receiving operations for the vehicle;

generating control signals for the vehicle, based on the operations; and transmitting the control signals to the vehicle, wherein when impact is detected based on at least one of (1) change in acceleration of the remote vehicle control device and (2) sound, a control signal for stopping is transmitted to the vehicle, the remote vehicle control device receives an operation track related to a traveling route of the vehicle, a control signal related to the traveling route of the vehicle is generated based on the operation track, and the remote vehicle control device changes a traveling velocity of the vehicle based on a thickness of the operation track.

13. The remote vehicle control method according to claim 12, wherein the impact is detected based on detected sound.

* * * * *